US010225445B2

(12) United States Patent
Lautenbach

(10) Patent No.: US 10,225,445 B2
(45) Date of Patent: Mar. 5, 2019

(54) METHODS AND APPARATUS FOR PROVIDING A CAMERA LENS OR VIEWING POINT INDICATOR

(71) Applicant: LIGHT LABS INC., Redwood City, CA (US)

(72) Inventor: Bradley Lautenbach, San Francisco, CA (US)

(73) Assignee: Light Labs Inc., Redwood City, CA (US)

(*) Notice: Subject to any disclaimer, the term of this patent is extended or adjusted under 35 U.S.C. 154(b) by 0 days.

(21) Appl. No.: 14/976,765

(22) Filed: Dec. 21, 2015

(65) Prior Publication Data

US 2017/0180615 A1 Jun. 22, 2017

Related U.S. Application Data

(60) Provisional application No. 62/269,732, filed on Dec. 18, 2015.

(51) Int. Cl.
*H04N 5/232* (2006.01)
*H04N 5/225* (2006.01)
(Continued)

(52) U.S. Cl.
CPC ......... *H04N 5/2256* (2013.01); *F21V 23/003* (2013.01); *F21V 33/0052* (2013.01);
(Continued)

(58) Field of Classification Search
CPC ............... H04N 5/2256; H04N 5/2257; H04N 5/23293; H04N 5/23222; F21V 33/0052; F21V 23/003; F21Y 2115/10
See application file for complete search history.

(56) References Cited

U.S. PATENT DOCUMENTS 4,427,888 A 1/1984 Galvin
4,544,241 A 10/1985 LaBudde et al.
(Continued)

FOREIGN PATENT DOCUMENTS

EP 2642757 A2 9/2013
JP 10091765 4/1998
(Continued)

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.
(Continued)

*Primary Examiner* — Hung H Lam
(74) *Attorney, Agent, or Firm* — Straub & Straub; Michael P. Straub; Stephen T. Straub

(57) ABSTRACT

Methods and apparatus for providing a user of a camera information about the status of one or more lenses and/or providing a subject of a photograph an indicator of where to look during image capture are described. In some embodiments different sets of camera modules are used for taking photographs depending on user input and/or the distance to the objects to be captured. In various embodiments an indicator, e.g., light emitting element, is associated with each of the different sets of camera modules which maybe used to indicate where a subject should look during image capture by the corresponding set of camera modules. In some embodiment dirty lenses of the camera are detected and the user is notified of the dirty lenses through an audible and/or visual indication. In some embodiments the indication of which lens/lenses are dirty is provided by illuminating light emitting elements corresponding to the dirty lens (es).

17 Claims, 16 Drawing Sheets

(51) Int. Cl.
*F21V 23/00* (2015.01)
*F21V 33/00* (2006.01)
*H04N 5/217* (2011.01)
*F21Y 115/10* (2016.01)

(52) U.S. Cl.
CPC ......... *H04N 5/2171* (2013.01); *H04N 5/2254* (2013.01); *H04N 5/2257* (2013.01); *H04N 5/2258* (2013.01); *H04N 5/23222* (2013.01); *H04N 5/23293* (2013.01); *F21Y 2115/10* (2016.08)

(56) References Cited

U.S. PATENT DOCUMENTS

| | | | |
|---|---|---|---|
| 4,890,133 | A | 12/1989 | Ogawa et al. |
| 5,078,479 | A | 1/1992 | Vuilleumier |
| 5,153,569 | A | 10/1992 | Kawamura et al. |
| 5,353,068 | A | 10/1994 | Moriwake |
| 5,583,602 | A | 12/1996 | Yamamoto |
| 5,781,331 | A | 7/1998 | Carr et al. |
| 5,889,553 | A | 3/1999 | Kino et al. |
| 5,975,710 | A | 11/1999 | Luster |
| 5,982,951 | A | 11/1999 | Katayama et al. |
| 6,011,661 | A | 1/2000 | Weng |
| 6,028,600 | A | 2/2000 | Rosin et al. |
| 6,081,670 | A | 6/2000 | Madsen et al. |
| 6,141,034 | A | 10/2000 | McCutchen |
| 6,255,651 | B1 * | 7/2001 | Laluvein ............... G08B 17/12 250/339.15 |
| 7,009,652 | B1 | 3/2006 | Tanida et al. |
| 7,280,735 | B2 | 10/2007 | Thibault |
| 7,315,423 | B2 | 1/2008 | Sato |
| 7,551,358 | B2 | 6/2009 | Lee et al. |
| 7,561,201 | B2 | 7/2009 | Hong |
| 7,801,428 | B2 | 9/2010 | Nagaishi et al. |
| 7,810,511 | B2 | 10/2010 | Fagrenius et al. |
| 8,144,230 | B2 | 3/2012 | Watanabe et al. |
| 8,194,169 | B2 | 6/2012 | Tamaki et al. |
| 8,199,222 | B2 | 6/2012 | Drimbarean et al. |
| 8,237,841 | B2 | 8/2012 | Tanida et al. |
| 8,320,051 | B2 | 11/2012 | Matsumura et al. |
| 8,417,058 | B2 | 4/2013 | Tardif |
| 8,482,637 | B2 | 7/2013 | Ohara et al. |
| 8,520,022 | B1 | 8/2013 | Cohen et al. |
| 8,553,106 | B2 | 10/2013 | Scarff |
| 8,619,082 | B1 | 12/2013 | Ciurea et al. |
| 8,639,296 | B2 | 1/2014 | Ahn et al. |
| 8,665,341 | B2 | 3/2014 | Georgiev et al. |
| 8,704,944 | B1 | 4/2014 | Wierzoch et al. |
| 8,762,895 | B2 | 6/2014 | Mehta et al. |
| 8,780,258 | B2 | 7/2014 | Lee |
| 8,896,655 | B2 | 11/2014 | Mauchly et al. |
| 9,041,826 | B2 | 5/2015 | Jung et al. |
| 9,104,705 | B2 | 8/2015 | Fujinaga |
| 9,135,732 | B2 | 9/2015 | Winn et al. |
| 9,197,816 | B2 | 11/2015 | Laroia |
| 9,270,876 | B2 | 2/2016 | Laroia |
| 9,282,228 | B2 | 3/2016 | Laroia |
| 9,325,906 | B2 | 4/2016 | Laroia |
| 9,374,514 | B2 | 6/2016 | Laroia |
| 89,707,652 | * | 6/2016 | Akiyama ............ H04N 5/23229 348/187 |
| 9,423,588 | B2 | 8/2016 | Laroia |
| 9,426,365 | B2 | 8/2016 | Laroia et al. |
| 9,451,171 | B2 | 9/2016 | Laroia |
| 9,462,170 | B2 | 10/2016 | Laroia et al. |
| 9,467,627 | B2 | 10/2016 | Laroia |
| 9,544,501 | B2 | 1/2017 | Laroia |
| 9,544,503 | B2 | 1/2017 | Shroff |
| 9,547,160 | B2 | 1/2017 | Laroia |
| 9,549,127 | B2 | 1/2017 | Laroia |
| 9,551,854 | B2 | 1/2017 | Laroia |
| 9,554,031 | B2 | 1/2017 | Laroia et al. |
| 9,557,519 | B2 | 1/2017 | Laroia |
| 9,557,520 | B2 | 1/2017 | Laroia |
| 9,563,033 | B2 | 2/2017 | Laroia |
| 9,568,713 | B2 | 2/2017 | Laroia |
| 9,578,252 | B2 | 2/2017 | Laroia |
| 9,671,595 | B2 | 6/2017 | Laroia |
| 9,686,471 | B2 | 6/2017 | Laroia et al. |
| 9,690,079 | B2 | 6/2017 | Laroia |
| 9,736,365 | B2 | 8/2017 | Laroia |
| 9,749,511 | B2 | 8/2017 | Laroia |
| 9,749,549 | B2 | 8/2017 | Shroff |
| D802,646 | S | 11/2017 | Laroia et al. |
| 9,824,427 | B2 | 11/2017 | Pulli et al. |
| 2002/0149691 | A1 | 10/2002 | Pereira et al. |
| 2003/0018427 | A1 | 1/2003 | Yakota et al. |
| 2003/0020814 | A1 | 1/2003 | Ono |
| 2003/0185551 | A1 | 10/2003 | Chen |
| 2003/0193604 | A1 | 10/2003 | Robins et al. |
| 2004/0027695 | A1 | 2/2004 | Lin |
| 2004/0100479 | A1 | 5/2004 | Nakano et al. |
| 2004/0227839 | A1 | 11/2004 | Stavely et al. |
| 2005/0088546 | A1 | 4/2005 | Wang |
| 2005/0200012 | A1 | 9/2005 | Kinsman |
| 2006/0067672 | A1 | 3/2006 | Washisu et al. |
| 2006/0187311 | A1 | 8/2006 | Labaziewicz et al. |
| 2006/0187338 | A1 | 8/2006 | May et al. |
| 2006/0221218 | A1 | 10/2006 | Alder et al. |
| 2006/0238886 | A1 | 10/2006 | Kushida et al. |
| 2006/0281453 | A1 | 12/2006 | Jaiswal et al. |
| 2007/0050139 | A1 | 3/2007 | Sidman |
| 2007/0065012 | A1 | 3/2007 | Yamakado et al. |
| 2007/0127915 | A1 | 6/2007 | Lu et al. |
| 2007/0177047 | A1 | 8/2007 | Goto |
| 2007/0182528 | A1 | 8/2007 | Breed et al. |
| 2008/0030592 | A1 | 2/2008 | Border et al. |
| 2008/0074755 | A1 | 3/2008 | Smith |
| 2008/0084484 | A1 | 4/2008 | Ochi et al. |
| 2008/0111881 | A1 | 5/2008 | Gibbs et al. |
| 2008/0180562 | A1 | 7/2008 | Kobayashi |
| 2008/0211941 | A1 | 9/2008 | Deever et al. |
| 2008/0219654 | A1 | 9/2008 | Border et al. |
| 2008/0240698 | A1 | 10/2008 | Bartilson et al. |
| 2008/0247745 | A1 | 10/2008 | Nilsson |
| 2008/0251697 | A1 | 10/2008 | Park et al. |
| 2008/0278610 | A1 | 11/2008 | Boettiger |
| 2009/0059037 | A1 * | 3/2009 | Naick ............... H04N 5/23293 348/231.99 |
| 2009/0086032 | A1 | 4/2009 | Li |
| 2009/0136223 | A1 | 5/2009 | Motomura et al. |
| 2009/0154821 | A1 | 6/2009 | Sorek et al. |
| 2009/0225203 | A1 | 9/2009 | Tanida et al. |
| 2009/0278950 | A1 | 11/2009 | Deng et al. |
| 2009/0290042 | A1 | 11/2009 | Shiohara |
| 2010/0013906 | A1 | 1/2010 | Border et al. |
| 2010/0034531 | A1 | 2/2010 | Go |
| 2010/0045774 | A1 | 2/2010 | Len et al. |
| 2010/0053414 | A1 | 3/2010 | Tamaki et al. |
| 2010/0079635 | A1 | 4/2010 | Yano et al. |
| 2010/0091089 | A1 | 4/2010 | Cromwell et al. |
| 2010/0097443 | A1 | 4/2010 | Lablans |
| 2010/0225755 | A1 | 9/2010 | Tamaki et al. |
| 2010/0238327 | A1 | 9/2010 | Griffith et al. |
| 2010/0265346 | A1 | 10/2010 | Iizuka |
| 2010/0283842 | A1 | 11/2010 | Gussin et al. |
| 2010/0296802 | A1 | 11/2010 | Davies |
| 2011/0051243 | A1 | 3/2011 | Su |
| 2011/0063325 | A1 | 3/2011 | Saunders |
| 2011/0069183 | A1 | 3/2011 | Venkataraman et al. |
| 2011/0080655 | A1 | 4/2011 | Mori |
| 2011/0123115 | A1 | 5/2011 | Lee et al. |
| 2011/0128393 | A1 | 6/2011 | Tavi et al. |
| 2011/0157430 | A1 | 6/2011 | Hosoya et al. |
| 2011/0157451 | A1 | 6/2011 | Chang |
| 2011/0187878 | A1 | 8/2011 | Mor et al. |
| 2011/0193984 | A1 | 8/2011 | Kitaya et al. |
| 2011/0221920 | A1 | 9/2011 | Gwak |
| 2011/0222167 | A1 | 9/2011 | Iwasawa |
| 2011/0242342 | A1 | 10/2011 | Goma et al. |
| 2011/0280565 | A1 | 11/2011 | Chapman et al. |
| 2011/0285895 | A1 | 11/2011 | Weng et al. |

(56) References Cited

U.S. PATENT DOCUMENTS

| | | |
|---|---|---|
| 2012/0002096 A1 | 1/2012 | Choi et al. |
| 2012/0013708 A1 | 1/2012 | Okubo |
| 2012/0027462 A1 | 2/2012 | Nozawa |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0212651 A1 | 8/2012 | Sawada |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0020470 A1 | 1/2013 | Luo et al. |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |
| 2013/0258044 A1 | 10/2013 | Betts-Lacroix |
| 2013/0300869 A1 | 11/2013 | Lu et al. |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0240579 A1 | 8/2014 | Park et al. |
| 2014/0267243 A1 | 9/2014 | Venkataraman et al. |
| 2014/0267844 A1 | 9/2014 | Iwata et al. |
| 2014/0293079 A1* | 10/2014 | Milanfar ............ H04N 5/2171 348/222.1 |
| 2014/0354714 A1 | 12/2014 | Hirschler et al. |
| 2015/0029595 A1 | 1/2015 | Swihart et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0163400 A1* | 6/2015 | Geiss ................ H04N 5/23229 348/231.99 |
| 2015/0234149 A1 | 8/2015 | Kreitzer et al. |
| 2015/0241713 A1 | 8/2015 | Laroia et al. |
| 2015/0244927 A1 | 8/2015 | Laroia et al. |
| 2015/0244949 A1 | 8/2015 | Laroia et al. |
| 2015/0253647 A1 | 9/2015 | Mercado |
| 2015/0279012 A1 | 10/2015 | Brown et al. |
| 2015/0296149 A1 | 10/2015 | Laroia |
| 2016/0004144 A1* | 1/2016 | Laroia ................ G03B 17/18 348/222.1 |
| 2016/0014314 A1 | 1/2016 | Laroia et al. |
| 2016/0091861 A1 | 3/2016 | Liu et al. |
| 2016/0112637 A1 | 4/2016 | Laroia et al. |
| 2016/0112650 A1 | 4/2016 | Laroia et al. |
| 2016/0142610 A1 | 5/2016 | Rivard et al. |
| 2016/0165101 A1* | 6/2016 | Akiyama ........... H04N 5/23229 348/187 |
| 2016/0182777 A1 | 6/2016 | Laroia et al. |
| 2016/0306168 A1 | 10/2016 | Singh et al. |
| 2016/0309095 A1 | 10/2016 | Laroia et al. |
| 2016/0309110 A1 | 10/2016 | Laroia et al. |
| 2016/0309133 A1 | 10/2016 | Laroia et al. |
| 2016/0316117 A1 | 10/2016 | Singh et al. |
| 2016/0360109 A1 | 12/2016 | Laroia et al. |
| 2016/0381301 A1 | 12/2016 | Shroff |
| 2017/0031138 A1 | 2/2017 | Laroia |
| 2017/0041528 A1 | 2/2017 | Lai et al. |
| 2017/0054919 A1 | 2/2017 | Laroia |
| 2017/0059857 A1 | 3/2017 | Laroia et al. |
| 2017/0070683 A1 | 3/2017 | Laroia |
| 2017/0099439 A1 | 4/2017 | Pulli et al. |
| 2017/0123189 A1 | 5/2017 | Laroia |
| 2017/0126976 A1 | 5/2017 | Laroia |
| 2017/0180615 A1 | 6/2017 | Lautenbach |
| 2017/0180637 A1 | 6/2017 | Lautenbach et al. |
| 2017/0201699 A1 | 7/2017 | Laroia |
| 2017/0208230 A1 | 7/2017 | Laroia |
| 2017/0208257 A1 | 7/2017 | Laroia |
| 2017/0223286 A1 | 8/2017 | Laroia et al. |
| 2017/0280135 A1 | 9/2017 | Shroff et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010114760 A | 5/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |
| WO | 2009145401 A1 | 12/2009 |
| WO | 2012089895 A1 | 7/2012 |

OTHER PUBLICATIONS

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

Notification Concerning Transmittal of International Preliminary Report on Patentability with the Written Opinion of the International Searching Authority dated Jun. 28, 2018, pp. 1-5.

* cited by examiner

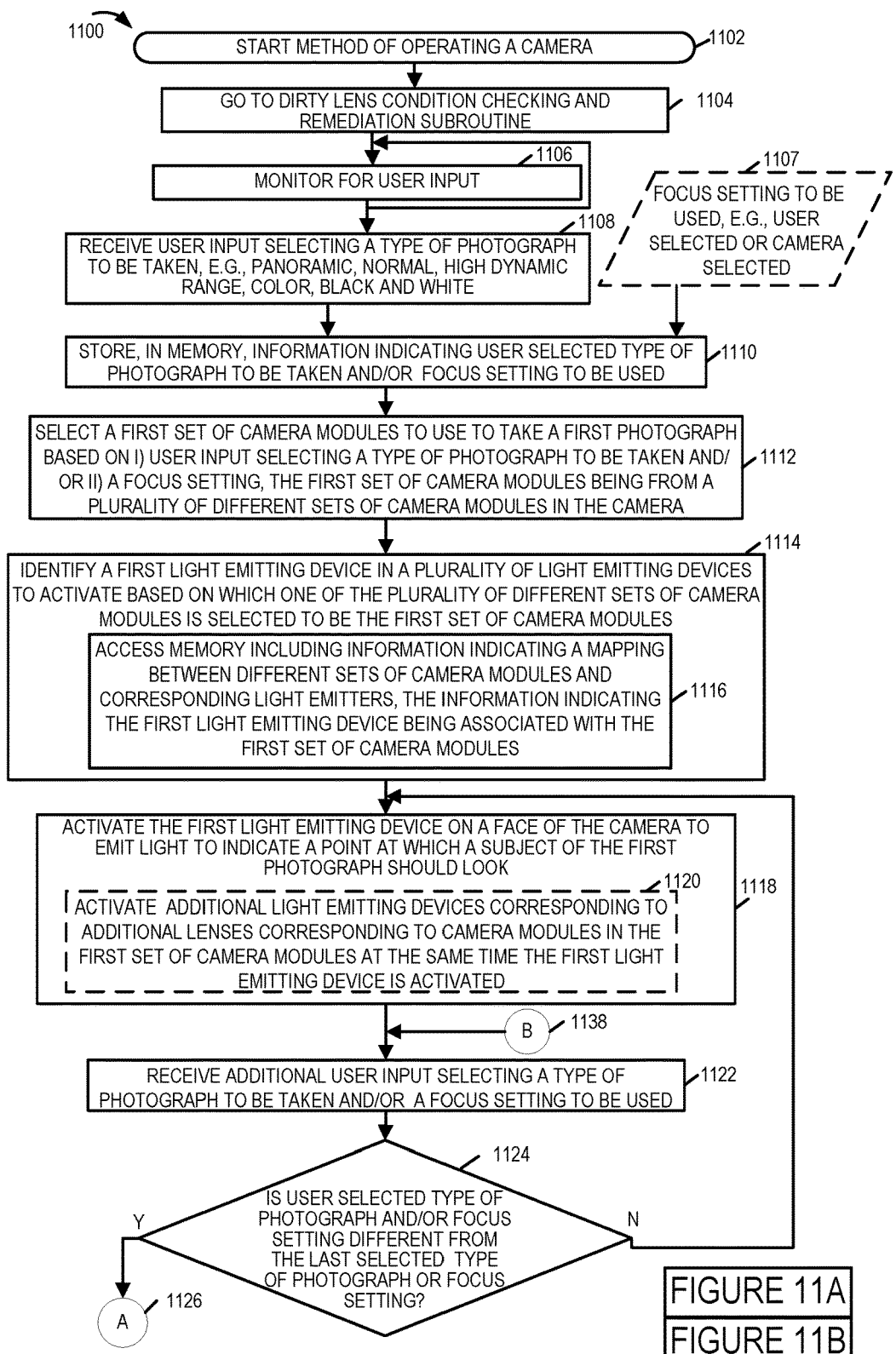

METHODS AND APPARATUS FOR PROVIDING A CAMERA LENS OR VIEWING POINT INDICATOR

RELATED APPLICATIONS

The present application claims the benefit of U.S. Provisional Application Ser. No. 62/269,732 filed Dec. 18, 2015 which is hereby expressly incorporated by reference in its entirety.

FIELD

The present application relates to camera device methods and apparatus and, more particularly, to methods and apparatus for providing a lens or viewing point indicator to a camera user and/or subject of a photograph.

BACKGROUND

Cameras with multiple optical chains, e.g. camera modules, and thus camera lenses are beginning to be used. Such devices have advantages over single lens systems in size and weight for at least some applications.

In at least some such devices one or a set of camera modules may be used at a given time with one or more other camera modules going unused during a given period of time. Which camera module or modules is used at a given time may not be clear to a user of the camera and/or subject of an image. As a result, rather than looking at the lens of the camera module being used to capture an image, a subject of an image may look at the lens of an optical chain which is not being used to capture the subject's image at the time a photograph is being taken. While the outer lens of the optical chains of a camera maybe relatively close together, the difference between a user looking at the lens of the optical chain being used to capture the image or the lens of an optical chain not being used to capture the image can be noticeable in the captured image.

Thus the presence of multiple lenses in a camera with multiple camera modules, some of which may not be used at a given time, can make it difficult for a subject to know where to look when an image is being taken and different subjects in a photograph may look at different lenses based on confusion as to where to look at the time the photograph is taken.

While multiple lenses may create confusion as to where to look when a photograph is taken, it can also create confusion at other times as well. In some camera devices a user maybe provided an indication that one or more lenses are dirty, e.g., due to dust and/or other particles settling on them, and should be cleaned. Given that a camera device may include multiple lenses, it maybe difficult for a user to determine which of the multiple lenses needs to be cleaned and, in fact, the user may dirty a clean lens by trying to unnecessarily clean it.

In view of the above discussion, it should be appreciated that there is a need for methods and/or apparatus which could help with providing an indication with regard to at least one of where to look during the taking of a photograph or which lens should receive a user's attention would be desirable. In particular there is a need for methods and apparatus for providing a subject of a camera device an indication as to where to look during the taking of a photograph. There is also a need for providing information to a user of the camera as to which lens of the camera needs the user's attention, e.g., when cleaning of a lens is required.

Addressing at least one of the above noted problems would be desirable but it would be even better if in some but not necessarily all systems some of the hardware used to provide information about a dirty lens could also be used to provide an indicator as to where a subject of a camera should look during a photograph.

SUMMARY

Methods and apparatus for providing a user of a camera information about the status of one or more lenses and/or providing a subject of a photo an indicator of where to look while a photo is being taken are described. The methods can be used individual or in combination. For example, some cameras may support dirty lens indication functions. Other cameras may support an indicator of where a subject should look during taking of a picture and in still other embodiments a camera may support both indicators about lens condition and/or where a user should look during taking of a photo.

In some embodiments the camera includes multiple camera modules. During the taking of a photograph multiple camera modules maybe used but not necessarily all camera modules. In some embodiments different sets of camera modules are used for depending on the user input and/or the distance to the objects to be captured in images taken by the camera modules of the camera. For example, a first set of camera modules maybe used to capture a panoramic image while a different, e.g., second set of camera modules maybe used to capture a photograph of someone nearby. Still another set of camera modules, e.g., a third set of camera modules maybe used to capture a high dynamic range with multiple camera modules being used to capture an image but with different exposure times being used.

In various embodiments an indicator, e.g., light emitting element, is associated with each of the different sets of camera modules which maybe used to indicate where a subject should look when a photograph is being taken using the corresponding set of camera modules. The indicator corresponding to a set of camera modules is sometimes located at the center of the set of camera modules or near a reference camera included in the set of camera modules to which the indicator corresponds.

In some embodiments the indicator as to where a user should look is a ring around a camera module's outer lens. Because the place where a subject is to look may not correspond precisely to one camera module in the set of camera modules the indicator which is illuminated may, and sometimes is, an indicator surrounding a camera module which is not in the set being used to capture images but located at or near the center of the set of camera modules being used. In other embodiments where the controllable indicators are separate from the camera modules the indicator corresponding to the set of camera modules maybe and sometimes is placed on the front of the camera at the location where a subject should look. While this will normally correspond to or be adjacent a camera module being used to capture the photograph, the location maybe at the center of the set of camera modules being used for example. In some cases all the camera modules being used to capture a photograph have corresponding indicators, light rings, which are illuminated so the subject can see which camera modules are active but in many such cases in addition to the light rings of the active cameras, an light emitting element indicating where a subject should look is also illuminated during image capture.

In order to provide a user of a camera information about which lenses of a camera need cleaning, the camera can and sometimes does detect dirty lenses. In some embodiments, when a dirty lens condition is detected, the user is notified of the dirty lens condition through an audible or visual indication of a dirty lens condition and information as to which lens or lenses have been determined to be dirty and need cleaning is provided to the user of the camera. In some embodiments the indication of which lens or lenses are dirty is provided on the display device of the camera, e.g., located on the back of the camera. In one such embodiment an image of the face of the camera is displayed and one or more of the lenses are indicated to be dirty, e.g., by a mark, shading or other indicator.

In still other embodiments a light emitting elements included on the face of the camera and are associated with lenses, e.g., at least one light emitting element per lens. The light emitting element corresponding to a dirty lens is illuminated to facilitate identification of a lens in need of cleaning. Multiple light emitting elements, corresponding to multiple different dirty lenses are illuminated in some embodiments when multiple lenses are determined to be dirty. After providing the camera user an opportunity to clean the dirty lens or lens, the camera checks the lenses again for dirt. Light emitting elements corresponding to lenses which were previously found to be dirty but are now determined to be clean are deactivated while lenses determined to still be dirty or are newly determined to be dirty will have corresponding light indicators illuminated to facilitate additional cleaning to the extent necessary. In this way a user can be informed of the success or failure of a cleaning attempt and will not unnecessarily try and clean a clean lens which might actually lead to dirtying of the lens or scratching.

In some embodiments the light emitting elements used to indicate dirty lenses are light rings which surround individual lenses and which can be activated or deactivated on a per lens basis. In other embodiments a light, e.g., LED (Light Emitting Diode) or other indicator is positioned adjacent the lens and serves to indicate the status of the lens to which it corresponds and/or can also be used as an indicator where a subject should look when a photograph is being taken. Thus in some embodiments one or more of the light emitting devices used to indicate which lenses are dirty are also used during taking of a photograph to indicate where a subject should look.

In some embodiments light emitters on a face of a camera with multiple camera modules are used to support both a dirty lens indication and an indication where a user should look when a photograph is being taken. In other embodiments light emitters are used for dirty lens indication but not where a subject should look. In still other embodiments one or more light emitters are used to indicate where a subject should look but not to indicate a dirty lens condition.

The term lens in the present application is intended to cover flat protective optical elements with little or no optical power, e.g., a plate of glass or plastic with zero or near zero optical power, as well as optical elements with an optical power. Thus outer lens is used herein in various places to refer to an outer protective transparent cover, e.g., plate of glass or plastic or a lens with an optical power that serves as the outer element of an optical chain, e.g., camera module. Numerous variations benefits and embodiments are discussed further in the detailed description which follows.

BRIEF DESCRIPTION OF THE FIGURES

FIG. 11A is a first part of a flowchart illustrating the steps of an exemplary method of operating an exemplary camera device in accordance with an exemplary embodiment.

FIG. 11 comprising the combination of FIGS. 11A and 11B illustrates the steps of an exemplary method of operating a camera device in accordance with an exemplary embodiment.

DETAILED DESCRIPTION

Figure 1:
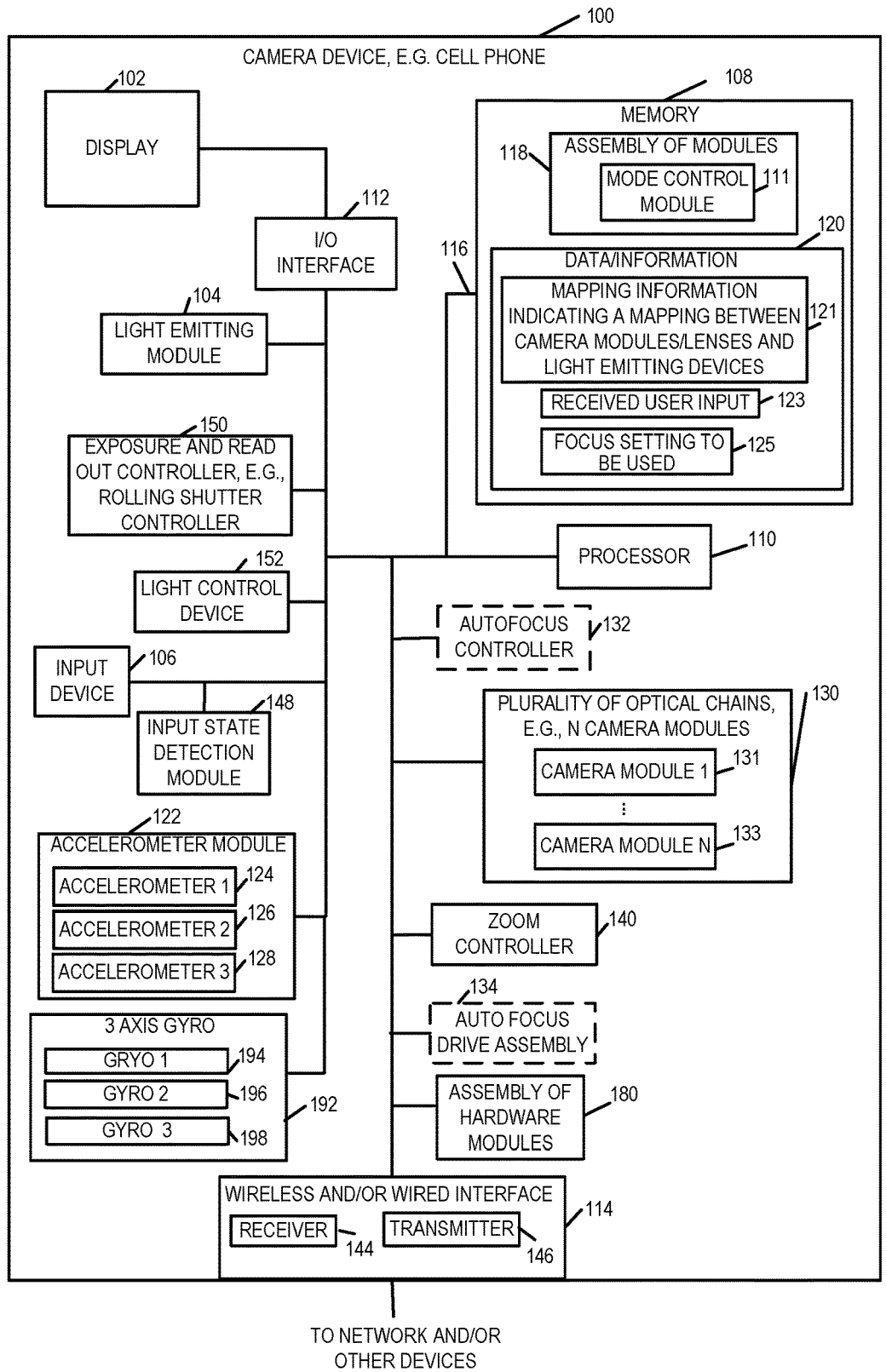
FIG. 1 is a block diagram of an exemplary apparatus, e.g., a camera device, implemented in accordance with an embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting devices which can be individually controlled so that all the light emitting elements need not be on at the same time. The input device 106 may be, and in some embodiments is, e.g., keypad, touch screen, or similar device that may be used for inputting information, data and/or instructions. Thus a user input is received via the input device in some embodiments. The user input in some embodiments indicated a user selection of a type of photograph to be taken (e.g., panoramic, normal, high dynamic range (in terms of light range), color, black and white). In some embodiment the received user input indicates a user selected focus setting to be used for taking one or more photographs. It should be appreciated that to support different focus settings different sets of lenses (corresponding to camera different modules) may be selected for use in image capture. The received user input is stored in memory 108 as the current user input 123, e.g., indicating a currently selected type of photograph and/or other user selected input parameter.

The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. For example, in some embodiments the camera device 100 is implemented using a set of camera modules as shown in FIG. 7A while in other embodiments the camera device 100 may be implemented using other module arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments. In some embodiments various camera modules are divided into different groups, e.g., sets of camera modules, with each set of the camera modules operating together as a group in image capture operation.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting devices, e.g., light emitting diodes (LEDs) and/or other types of light emitters, which can be illuminated in a controlled manner with the LEDs being controlled in groups or individually, e.g., in a synchronized manner based on operation of the rolling shutter and/or the exposure time, and/or or in order to indicate a dirty lens condition. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting devices, e.g., LEDs. In some embodiments the light emitting elements in the LED module 104 are arranged on a face of the camera with each individual light emitting device and/or a group of light emitting devices being able to be activated, e.g., illuminated, in accordance with the methods of the present invention. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

In accordance with one aspect of some embodiments various light emitting devices in the camera 100 can be activated individually to indicate a dirty lens condition and/or a point at which a subject of a photograph should look. In some such embodiments the light emitting devices arranged in the camera 100 in a way such that when a light emitting device is activated, e.g., powered to emit light, the light emitting device and/or the emitted light is visible from a face of the camera. In some embodiments one or more light emitting devices in the LED module 104 are on the face of said camera. In some embodiments light emitting devices are arranged, e.g., on the face of a camera, around outer lenses of the various camera modules in the camera such that when a given light emitting device is activated the light emitting device forms an illuminated ring around the lens of the corresponding camera module.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments. The light control device 152 (also referred to as the light controller 152) is configured to control light emitting devices in the camera, e.g., in a synchronized manner with the operation of the rolling shutter controller 150, individually or in groups in accordance with the features of the invention to support indication of dirty lens condition and/or a point where a subject of a photograph should look at during image capture. In some embodiments the light control device 152 is configured to activate different sets of light emitting devices to emit light based on a detected one or more dirty lenses and/or based on a selected set of camera modules being used for image capture at a given time. In some embodiments the light control device 152 is configured to activate a first light emitting device on a face of the camera 100 to emit light to indicate a dirty lens or a point at which a subject of a photograph should look. In some embodiments the light control device 152 is further configured to activate additional light emitting devices corresponding to additional lenses corresponding to camera modules in a set of camera modules at the same time the first light emitting device is activated, e.g., all light emitters corresponding to a group of camera modules so a user is able to determine which camera modules are being used to take a photo at the given time. In some embodiments the light control device 152 is further configured to deactivate one or more light emitting devices corresponding to lenses determined to no longer be dirty and keep light emitting devices corresponding to dirty lenses active and emitting light to signal that further cleaning is required.

In some embodiments the light control device 152 is further configured to activate at least one light emitting device on the face of the camera associated with a dirty lens to emit light to signal that the lens is dirty. In some embodiments activating at least one light emitting device on the face of the camera includes activating light emitting devices corresponding to multiple different dirty lenses to indicate which lenses are dirty while leaving light emitting devices corresponding to lenses which were not detected to be dirty unlit. In some embodiments the light control device 152 is further configured to deactivate the light emitting devices associated with lenses which were previously determined to be dirty but are no longer determined to be dirty.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines (e.g., in embodiments where one or more modules are implemented as software) stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention.

The assembly of modules 118 includes a mode control module 111 which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. In some depending on user input and/or a selected focus setting the mode control module 111 controls the camera to operate in different modes where different camera modules may be selected for image capture. In some such embodiments depending on a selected set of camera modules being active at a given time, one or more corresponding light emitting devices may be activated indicate a dirty lens or a point at which a subject of a photograph should look in accordance with the features of the present invention. In some embodiments, the operations performed by the processor when executing the instructions from one or more assembly of modules is instead performed by a hardware module which performs the same functionality and is included in the hardware assembly of modules 180.

The data and information 120 stored in memory 108 includes e.g., captured images of a scene, combined images of a scene, mapping information indicating association between light emitting devices and camera modules/lenses, received user input etc. and may be used by the camera device to perform various function in accordance with the invention, additional processing, and/or output, e.g., to display device 102 for display or to another device for transmission, processing and/or display. Mapping information 121 includes information indicating a mapping between different lenses corresponding to different camera modules in the camera and the light emitting devices corresponding to these lenses/camera modules. In some embodiments there is a one to one mapping between the lenses corresponding to different camera modules and the light emitting devices. Thus by using the stored mapping information the light emitters, e.g., LEDs, corresponding to various lenses (e.g., including dirty lenses) can be identified in accordance with the invention. In some embodiments the mapping information further indicates a mapping between different sets of camera modules (corresponding to different lenses) in the camera and corresponding light emitting devices, e.g., for example information indicating a first light emitting device being associated with a first set of camera modules. Thus in various embodiments the mapping information 121 indicates which light emitting device are associated with which set of camera modules. A set may include one or a plurality of camera modules. In some embodiments there is a one to one mapping between the lenses corresponding to the camera modules in the camera and the light emitting devices. Thus using the mapping information 121 light emitting device(s) corresponding to a selected set of camera module to be used for image capture s can be identified.

The received user input 123 is a current user input, e.g., indicating a currently selected type of photograph and/or other user selected input parameter. When a new user input is received indicating information which is different from the stored user input 123, the processor 110 updates the stored user input 123 to reflect the change. The focus setting to be used 125 includes focus setting value to be used for image capture operation at a given time and may be updated in a similar manner upon a user selected change and/or auto, e.g., camera selected, change in the focus setting.

The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

FIGS. 2-10 show various exemplary handheld camera devices implemented in accordance with various exemplary embodiments. The exemplary camera devices shown in FIGS. 2-10 includes a plurality of camera modules corresponding to different focal lengths, e.g., 35 mm focal length modules, 70 mm focal length modules, and 150 mm focal length modules, and various other components shown in the camera of FIG. 1. In some but not necessary all embodiments the camera focal length is expressed as a 35 mm equivalent focal length. The 35 mm equivalent focal length is a measure that indicates the angle of view of a particular combination of a camera lens and film or sensor size. The term is useful because most photographers experienced with interchangeable lenses are most familiar with the 35 mm film format.

The camera also includes one or more depth sensors, light emitting devices and a range finder and a flash unit. The range finder is an array based sensor capable of measuring depths to multiple objects corresponding to the area which may be captured by the image. The depth sensors measure a single depth and may be used to detect a hand being placed over the sensor or an object nearby. The depth sensors and range finder may be IR based devices. In some embodiments the range finder is used for focus control. In addition to the elements shown in FIG. 2 and the other figures showing the components of the FIG. 2 camera embodiment the camera can, and in some embodiments does include a processor, memory and various control circuits such as shown in FIG. 1. In some embodiments the cameras shown in FIGS. 2-10 includes the elements shown in the camera device of FIG. 1.

Figure 2:
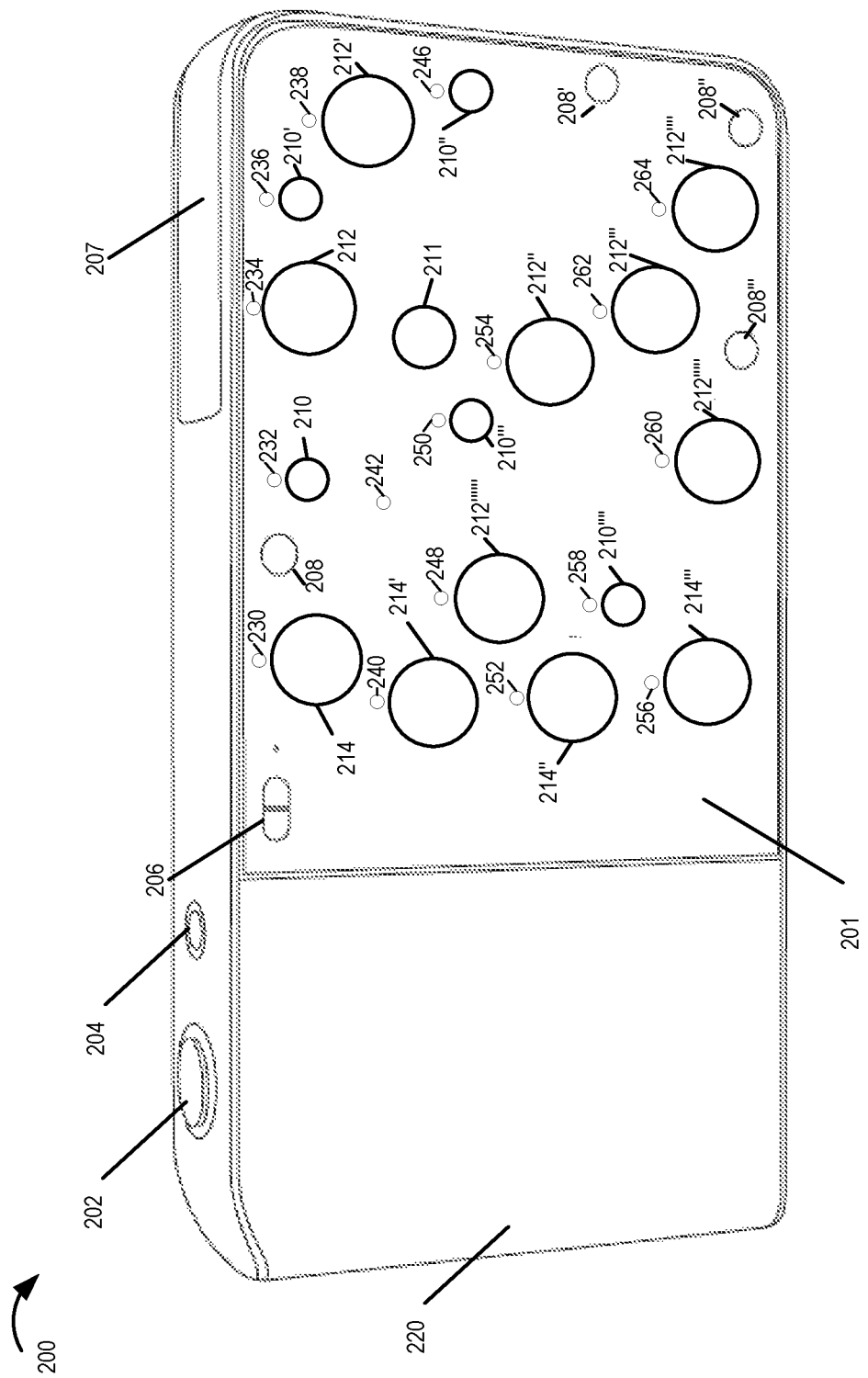
FIG. 2 is a perspective view of an exemplary camera device implemented using various camera modules and elements of the camera of FIG. 1, in accordance with a first embodiment.

FIG. 2 is a perspective view of an exemplary camera 200 implemented using various modules and components shown in FIG. 1. Exemplary camera 200 is a handheld camera with a plurality of camera modules 130 corresponding to 3 different focal lengths, one or more depth sensors, a range finder, a built in flash unit and a plurality of light emitting devices, e.g., LEDs, which can be appreciated from FIG. 2 that shows the face 201 of the camera 200. Camera 200 includes a shutter control 202, a power button 204, a flash 206, depth sensors (208, 208', 208", 208'''), 35 mm camera module lens (210, 210', 210", 210''', 210''''), a range finder distance sensor 211 with an array of sensors, 70 mm camera module lens (212, 212', 212", 212''', 212'''', 212''''', 212''''''), 150 mm camera module lens (214, 214', 214", 214'''), a plurality of light emitting devices (230, 232, 234, 236, 238, 240, 242, 244, 246, 248, 250, 252, 254, 256, 258, 260, 262 and 264) and a battery compartment 220 with the outside portion and surface shaped to serve as a camera grip. The 70 mm camera modules and the 150 mm camera modules include movable mirrors. The 35 mm camera modules do not include mirrors. In some, but not necessarily all embodiments, no lenses are included before mirrors of 70 and 150 mm camera modules and the outer lenses in such embodiments are just a flat plate of glass or plastic. The position of the various LEDs and camera module outer lenses can be appreciated from the face 201 of the camera 200. In some embodiments at least some of the light emitting devices are positioned adjacent a corresponding lens while some may be positioned at or near a center of a cluster of lenses of the camera modules.

In accordance with one aspect of some embodiments one or more LEDs on the face 201 of the camera can be activated, e.g., controlled to emit light, to indicate a dirty lens and/or a point at which a subject of a photograph should look. Thus a user of the camera and/or a subject of a photograph can be informed, e.g., by way of one or more lit up LEDs, as to which one or more lenses corresponding to the camera modules needs cleaning and/or a position at which a subject of a photograph should look.

Figure 3:
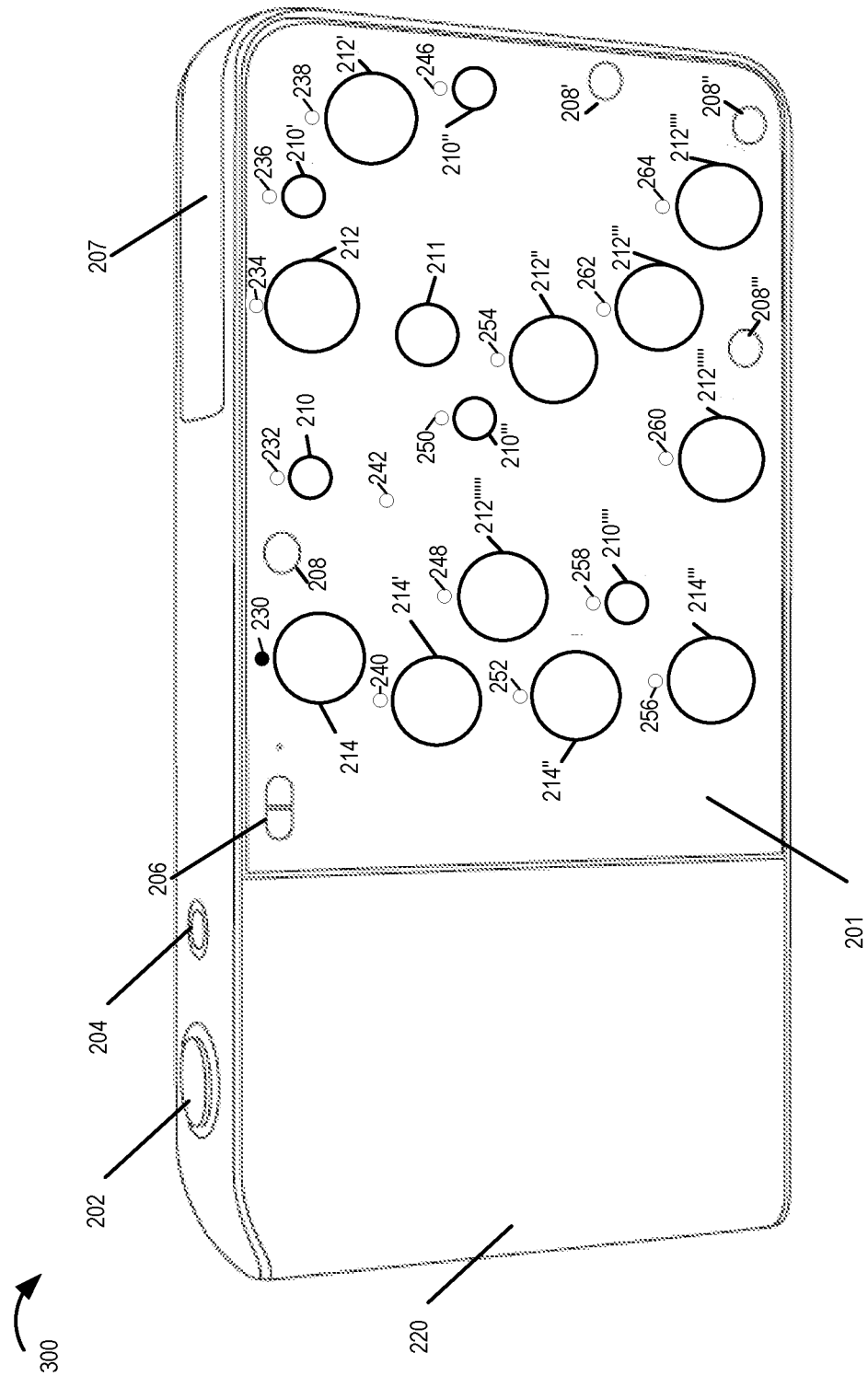
FIG. 3 illustrates a view of the exemplary camera device of FIG. 2 with a light emitting device on a face of the camera device being shown as being lit up, in accordance with an exemplary embodiment.

FIG. 3 is a drawing 300 illustrating a scenario where a light emitting device 230 adjacent camera module lens 214 of the camera 200 has been activated, e.g., powered to emit light (indicated by solid black fill), to indicate a dirty lens and/or a point at which a subject of a photograph should look. The activated LED 230 emitting light can be seen by an individual looking at the face 201 of the camera 200. In some embodiments as an alternative or in addition to showing the activated LED 230 on the face of the camera, an image of the face 201 of the camera 200 along with an indication (e.g., an image of lit up LED 230 or a graphical representation of lit up/flashing LED 230) is displayed on a display device on a back side of the camera 200 to indicate as to which of the multiple lenses (corresponding to the multiple camera modules with corresponding multiple lenses shown in FIG. 2) of the camera 200 are dirty. While in FIG. 2 for simplification a single light emitting device is illustrated as being lit, e.g., to indicate that a corresponding lens is dirty, it should be appreciated that in the event of multiple lenses being determined to be dirty multiple corresponding light emitting devices are activated to indicate the dirty condition of the corresponding lenses in some embodiments.

Figure 4:
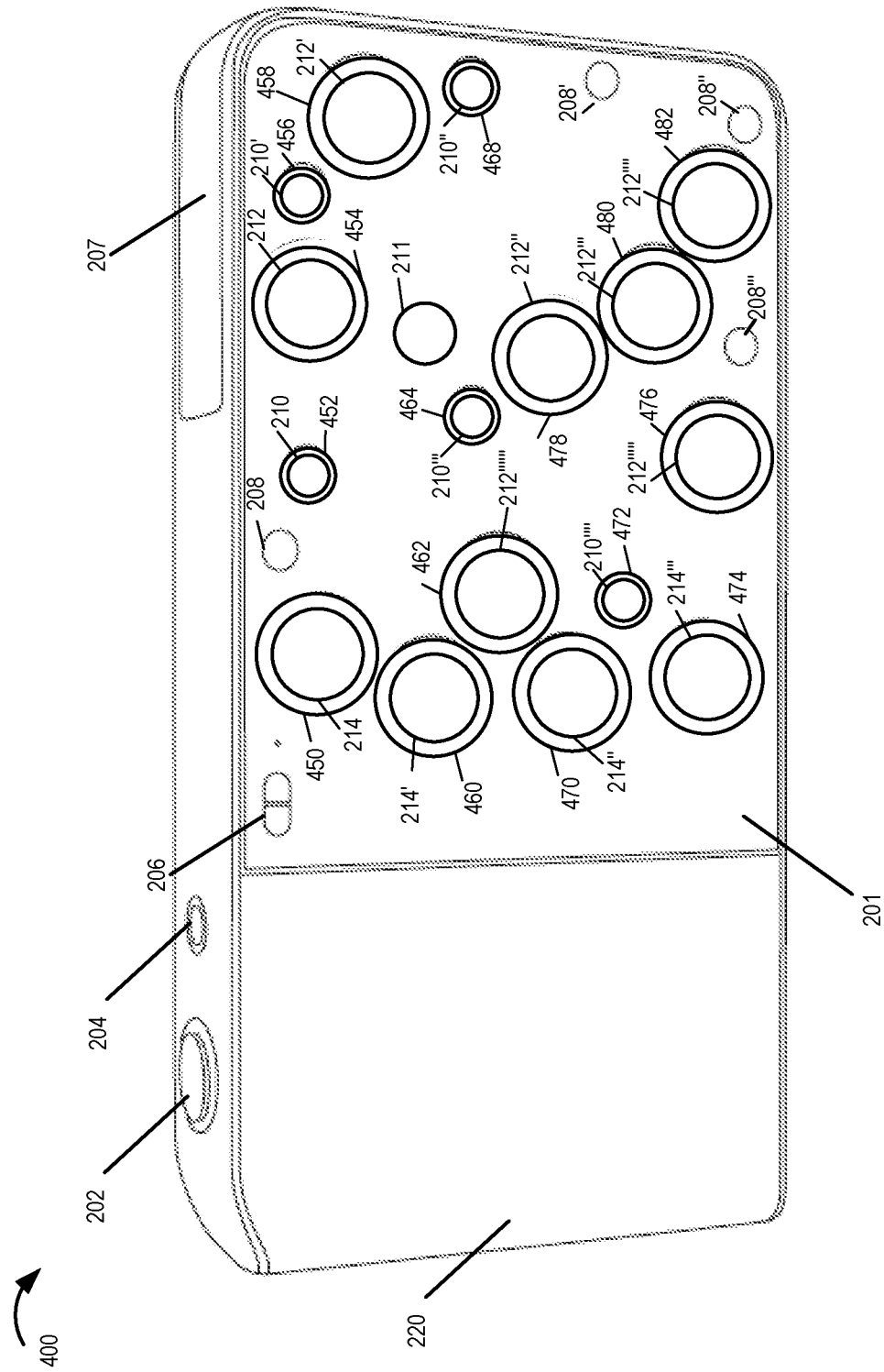
FIG. 4 is a perspective view of an exemplary camera implemented using various camera modules and elements of the camera of FIG. 1, in accordance with a second embodiment.

FIG. 4 is a perspective view of an exemplary camera 400 implemented using various modules and components shown in FIG. 1 in accordance with another exemplary embodiment of the invention. The exemplary camera 400 is similar to the camera 200 and includes various elements which are the same or similar such as the shutter control 202, a power button 204, a flash 206, depth sensors (208, 208', 208", 208'''), outer lenses corresponding to the 3 different focal length camera modules, depth sensors, range finder, built in flash unit which have therefore been indicated and labeled using the same reference numbers. The exemplary camera 400 further includes a plurality of light emitting devices, e.g., LEDs. However the light emitting devices in the FIG. 4 embodiment form a ring around each of the lenses corresponding to the 3 different focal length camera modules. As shown in FIG. 4 embodiment there is a light emitting device ring (452, 456, 468, 464, 472) around each of the 35 mm camera module lenses (210, 210', 210", 210''', 210''''), a light emitting device ring (454, 458, 478, 480, 482, 476, 462) around each of the 70 mm camera module lenses (212, 212', 212", 212''', 212'''', 212''''', 212''''''), and a light emitting device ring (450, 460, 470, 474) around each of the 150 mm camera module lenses (214, 214', 214", 214'''). A light emitting device ring may include a single light emitting device or multiple light emitting devices together may form the ring. In accordance with one aspect of some embodiments one or more LED rings may be activated to emit light and thus form light rings around corresponding lenses to indicate a dirty lens condition for the associated camera module lenses. Due to the appearance of a light ring around one or more lenses a user looking at the face 201 of the camera 400 would be able to determine that the corresponding lenses are dirty. Furthermore in some embodiments at least one light emitting device ring is activated in order to indicate to a subject of a photograph a point where the subject should look while the photograph is taken.

Figure 5:
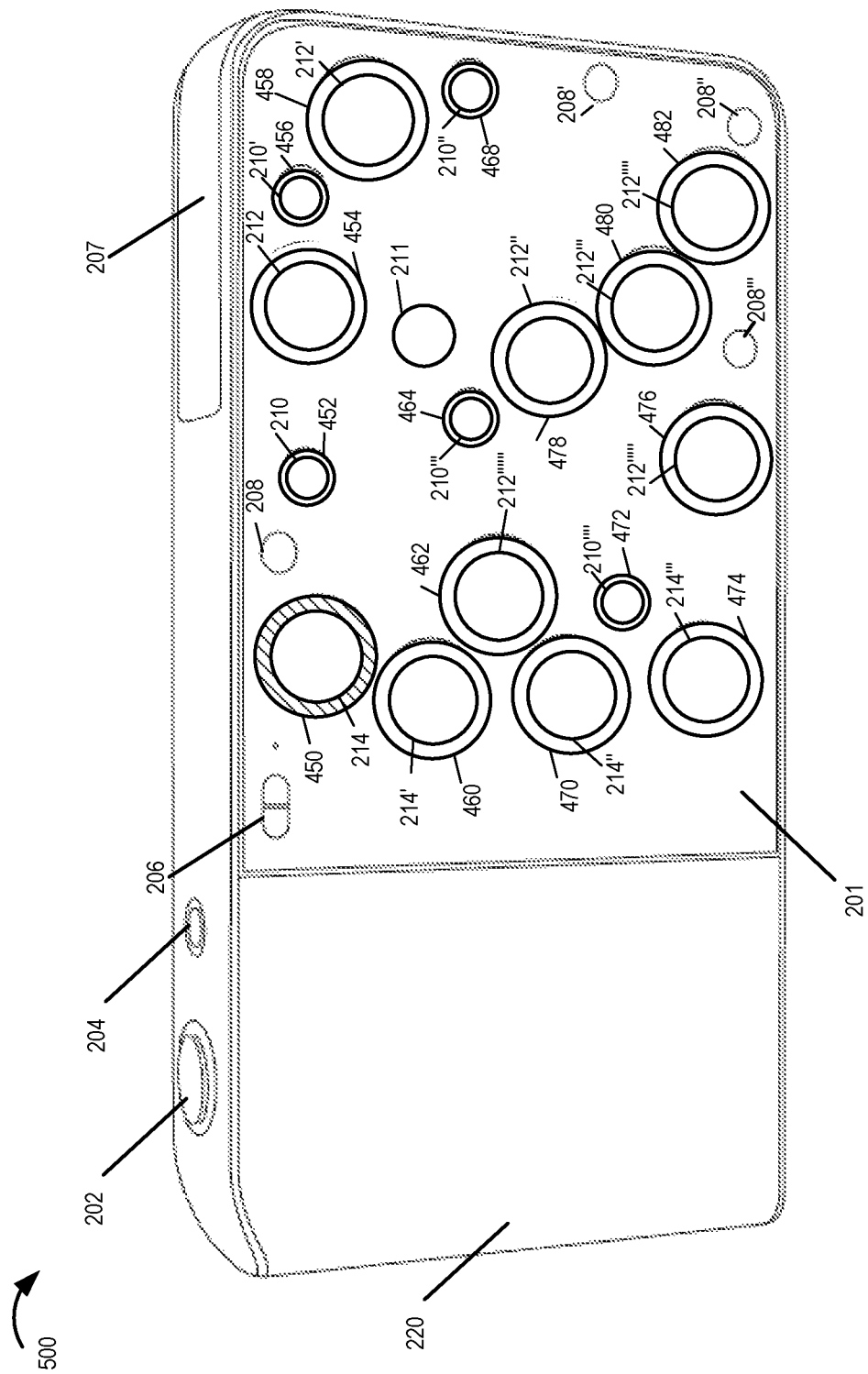
FIG. 5 illustrates a view of the exemplary camera of FIG. 4 with a light ring formed by an active light emitting device surrounding a lens on a face of the camera, in accordance with an exemplary embodiment.

FIG. 5 is a drawing 500 illustrating a scenario where a light emitting device ring 450 adjacent camera module lens 214 of the camera 400 has been activated, e.g., powered to emit light (indicated by the diagonal line pattern) to indicate a dirty lens condition of lens corresponding to lens 214 and/or a point at which a subject of a photograph should look. The activated LED ring 450 emitting light can be seen by an individual looking at the face 201 of the camera 400.

Figure 6:
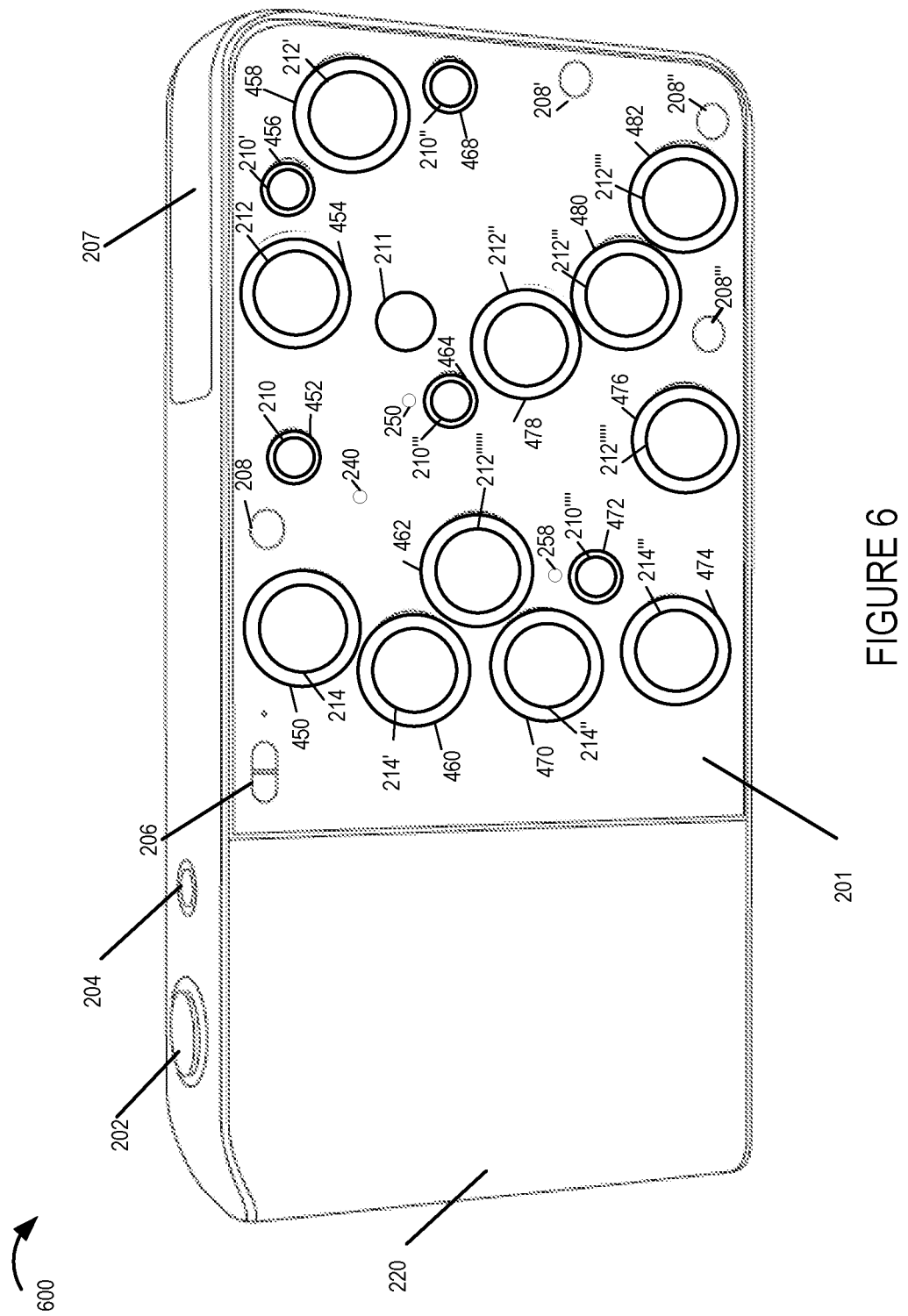
FIG. 6 illustrates a hybrid embodiment of the exemplary camera of FIG. 4 in which the camera includes additional light emitting devices in addition to the plurality of light emitting device rings around each of the camera module lenses shown in FIGS. 4-5.

FIG. 6 illustrates a perspective view of another exemplary camera 600 implemented in accordance with a hybrid embodiment, e.g., a hybrid embodiment of camera 200 and 400. Camera 600 is implemented using various modules and components shown in FIG. 1. Since various elements used in camera 600 are the same or similar to the camera devices shown in the previous figures therefore such elements have been indicated and labeled using the same reference numbers. In the embodiment of FIG. 6 the camera 600 includes 3 additional light emitting devices including LEDs 240, 250 and 258 in addition to the plurality of light emitting device rings around each of the camera module lenses shown in FIGS. 4-5. The hybrid embodiment of drawing 600 is useful in many photography applications especially in cases where multiple camera modules are being used for capturing images, e.g., portraits, of a subject where it is normally important for the subject to be looking at the camera lens. In the case where multiple camera modules are being used, the subject can be simply indicated a point where to look at by activating an LED, e.g., positioned at or near a center of a cluster of lenses of the camera modules being used in image capture operation. For example in some embodiments where camera modules corresponding to lenses 214, 214", 212 and 212" are used to capture a photograph, the light emitting device 240 which is positioned at or near the center of the cluster of lenses 214, 214", 212 and 212" may be activated in order to indicate the subject of the photograph a point where to look at. The hybrid embodiment of FIG. 6 is useful in many other applications as well.

Figure 7:
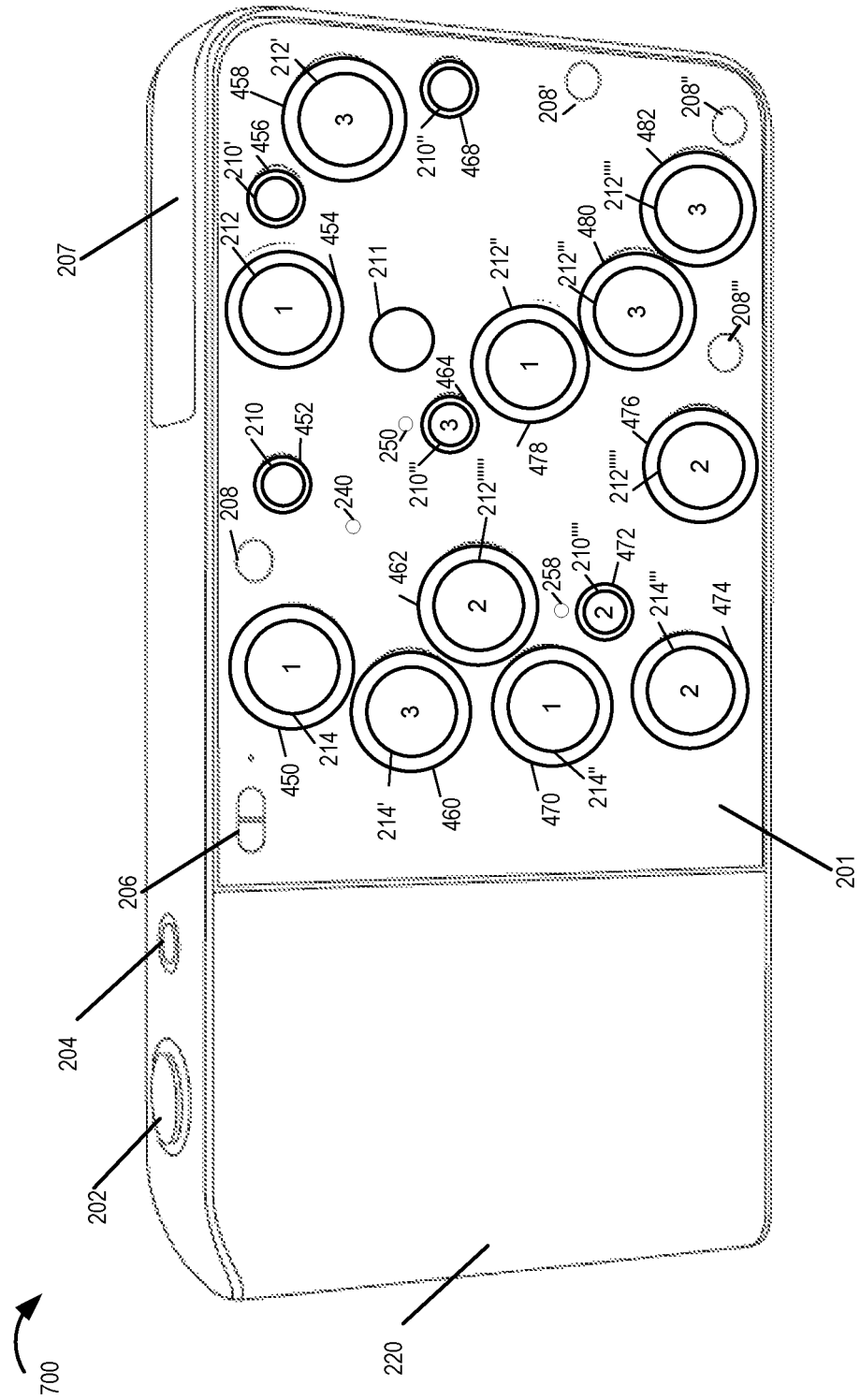
FIG. 7 illustrates an exemplary grouping of camera modules into different sets which is used in the camera devices implemented in accordance with some embodiments.

FIG. 7 is a drawing 700 illustrating an exemplary grouping of camera modules into different sets which is used in the camera devices implemented in accordance with some embodiments. While in FIG. 7 the hybrid embodiment camera 600 is used to illustrate the grouping of camera modules into different sets it should be appreciated that the camera module grouping may, and in some embodiments is, used in various other embodiments of the cameras illustrated in the other figures. In the exemplary camera module grouping shown in FIG. 7 example, there are three sets of camera modules including a first set of camera modules (marked "1") corresponding to lenses 214, 214", 212 and 212", a second set of camera modules (marked "2") corresponding to lenses 212""', 214", 210"", 214'" and 212""', and a third set of camera modules (marked "3") corresponding to lenses 214', 210'", 212'", 212"" and 212'. Each of the different sets of camera modules can be, and in some embodiments are, individually used to capture photographs, with each camera module in a given set being used in the image capture. For example the four camera modules corresponding to lenses 214, 214", 212 and 212" in the first set of camera modules are used together to take a picture while other camera modules in the camera may not being used. It should be appreciated that when a set of camera modules is used (active) in taking a photograph it can be confusing for the subject of the photograph where to look at. In accordance with one feature of some embodiments an exemplary configuration and/or arrangement of light emitting devices is used in the camera, with each set/group of camera modules being associated with at least one light emitting device which has been carefully arranged/positioned. In some embodiments the light emitting device corresponding to the active set/group of camera modules is positioned at or near a center of the cluster of lenses of camera modules included in the active set of camera modules. In some embodiments the light emitting device corresponding to the active set/ group of camera modules is positioned adjacent a lens of a reference camera included in the active set of camera modules. As discussed later with regard to FIG. 8 example in the case where the first set of camera modules corresponding to lenses 214, 214", 212 and 212" is being used for image capture, the light emitting device 240, which is positioned on the camera to correspond to the first set of camera modules, is activated (to emit light) in some embodiments to indicate a point where the subject should look at.

Figure 8:
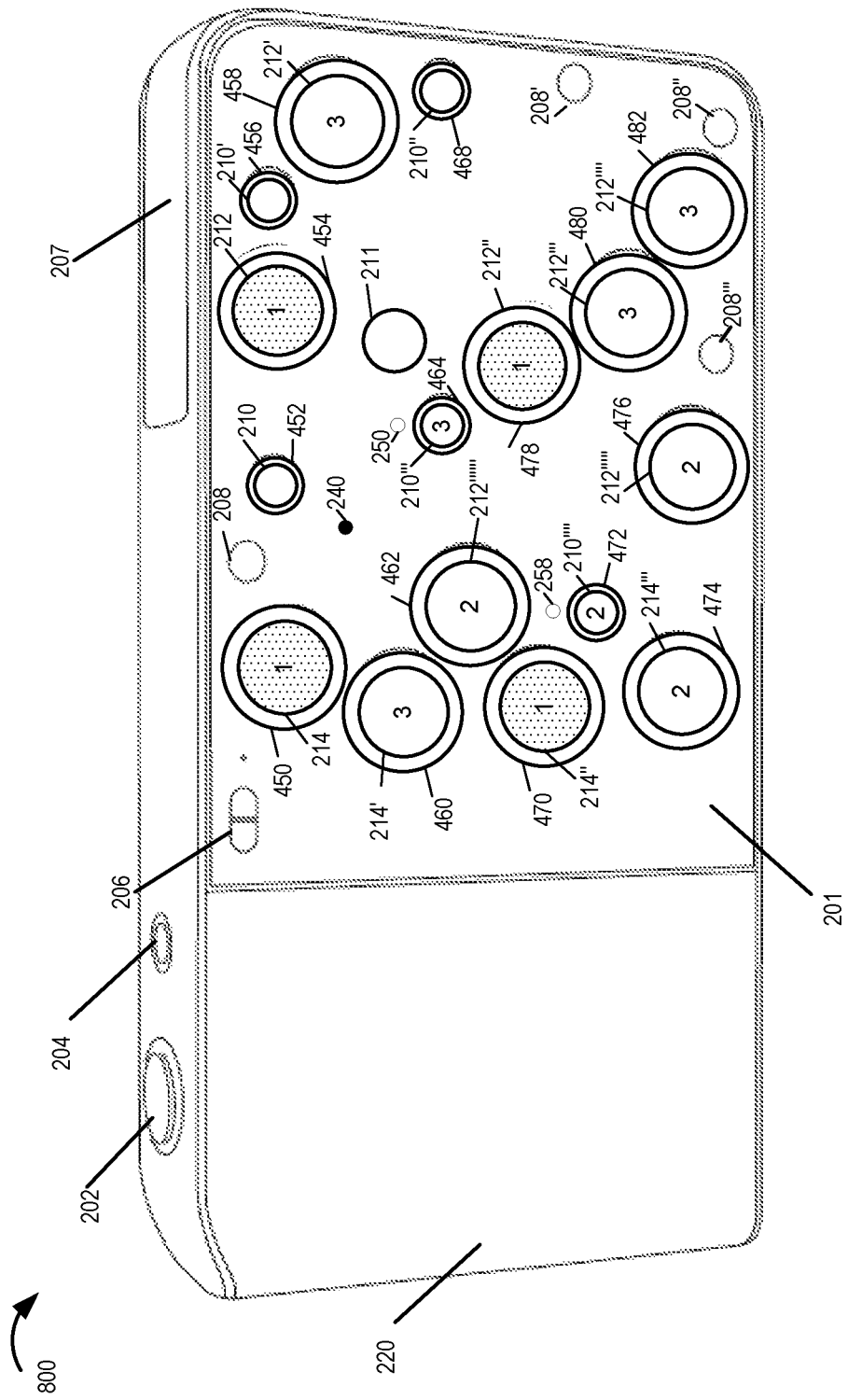
FIG. 8 illustrates an example where a first set of camera modules corresponding to the lenses shown with a dot fill pattern are used for image capture.

FIG. 8 is a drawing 800 illustrating an example where the first set of camera modules corresponding to lenses 214, 214", 212 and 212" is used for image capture. For illustration purposes the first set (labeled "1" in the circle representing the lens) of camera modules which is the active set of camera modules in the example is shown with a dot pattern fill. As shown in the figure in this example the light emitting device 240 positioned at or near a center of the cluster of lenses 214, 214", 212 and 212" of the active first set of camera modules is activated to emit light (shown using solid black fill) to indicate a point where the subject should look at. Such an indication to the subject of the photograph is beneficial since the subject will be not be confused where to look at, the need for repeated image capture due to the subject not looking at the right point is eliminated or reduced, and the overall quality of photograph and satisfaction of the subject is improved.

The selection of a set of camera module for a given image capture operation at a given time may depend on, e.g., user input selecting a type of photograph to be taken, e.g., panoramic, normal, high dynamic range (in terms of light range), color, black and white) or a focus setting to be used (near or far may use different sets of lenses). However in some embodiments it is transparent to the user of the camera and/or subject of a photograph as to which set of camera modules is being used for image capture at a given time. Still in accordance with the features of the invention the user and/or subject of a photograph is indicated a point where to look at during image capture by activating the light emitting device associated with the group of camera modules being used in the image capture. Furthermore in some embodiments the user of camera device is notified of one or more dirty lenses on the camera by activating the light emitting devices, e.g., light emitting device rings and/or individual light emitters, corresponding to these dirty lenses.

Figure 9:
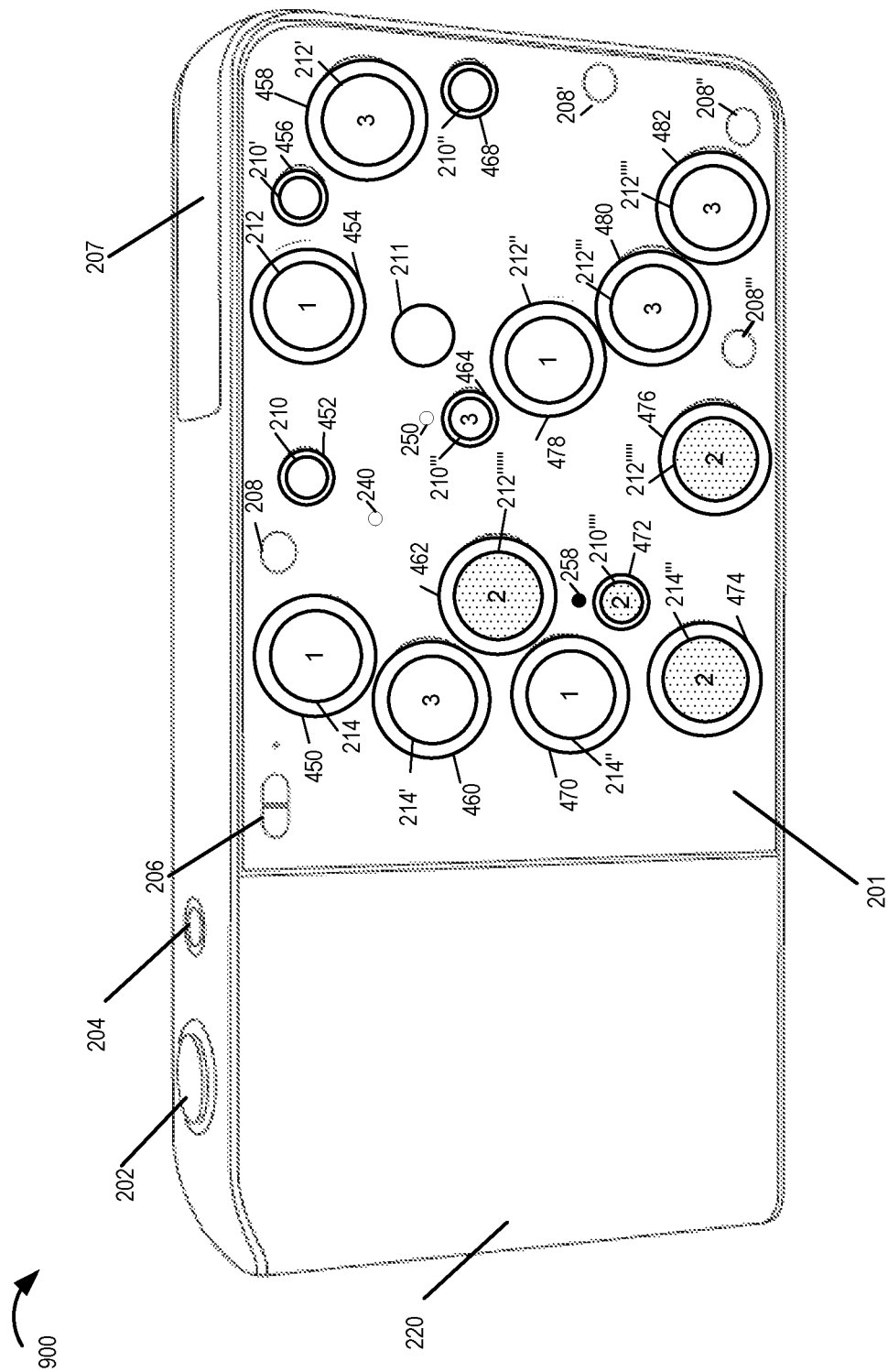
FIG. 9 illustrates an example where a second set of camera modules corresponding to lenses shown with the dot fill pattern is active, e.g., being used for image capture at the given time.

FIG. 9 is a drawing 900 illustrating an example where the second set of camera modules corresponding to lenses 212""', 214", 210"", 214'" and 212""' is active, e.g., being used for image capture at the given time. For illustration purposes the second set (labeled "2" in the lens) of camera modules which is the active set of camera modules in the example is shown with the dot pattern fill. As shown in FIG. 9 in this example the light emitting device 258 positioned at or near a center of the cluster of lenses 212""', 214", 210"–, 214'" and 212""' of the active second set of camera modules is activated to emit light (shown using solid black fill) to indicate a point where the subject should look at thus improving the overall quality of the photograph and satisfaction of the subject of the photograph.

Figure 10:
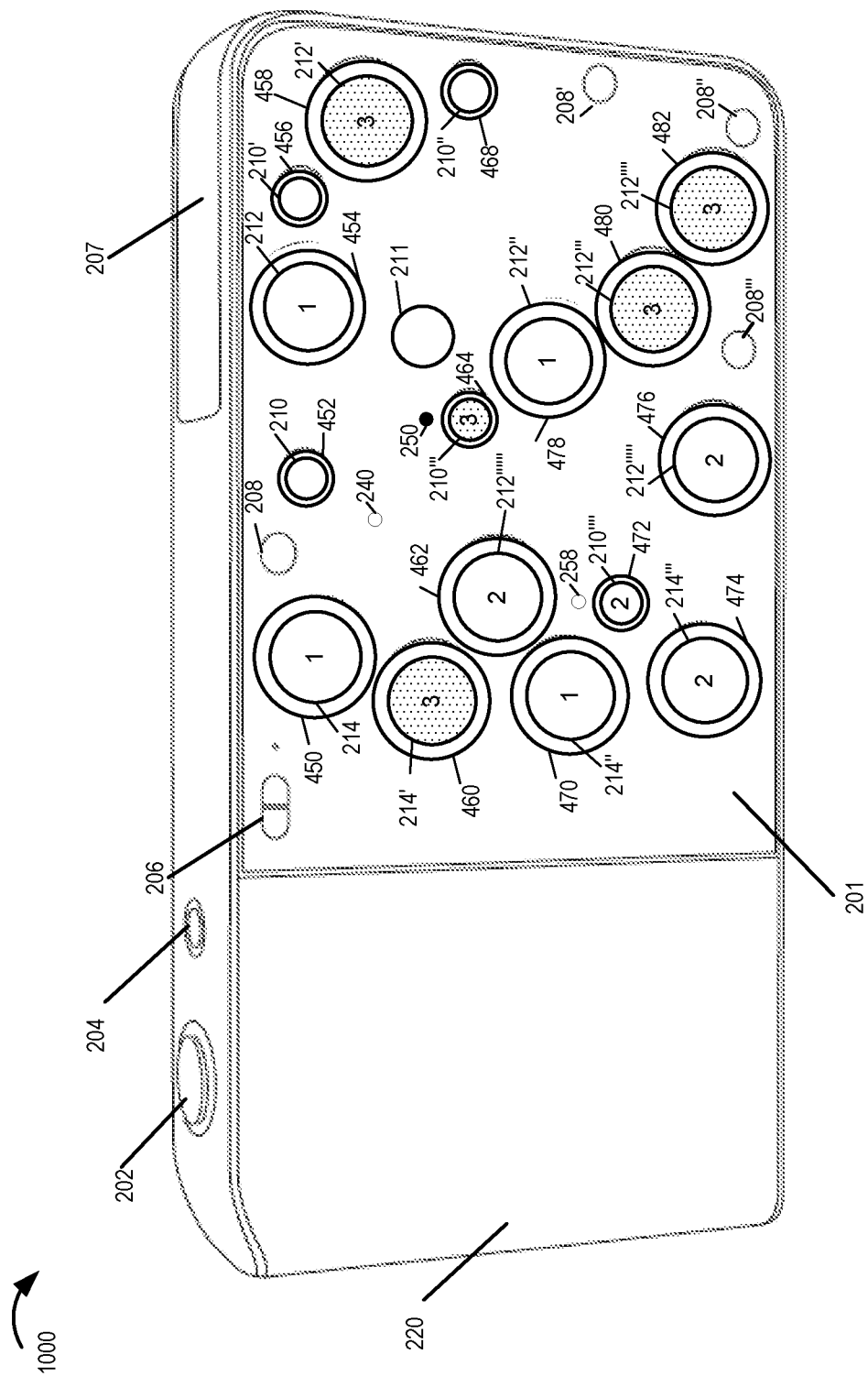
FIG. 10 illustrates an example where the third set of camera modules corresponding to lenses shown with the dot fill pattern is active for image capture at the given time.

FIG. 10 is a drawing 1000 illustrating an example where the third set of camera modules corresponding to lenses 214', 210'", 212'", 212"" and 212' is active for image capture at the given time. The third set (labeled "3" in the lens) of camera modules which is the active set of camera modules in the example is shown with the dot pattern fill. As shown in FIG.

10 in this example the light emitting device 250 is activated to emit light (shown using solid black fill) to indicate a point where the subject should look at. The third set of camera modules includes one reference camera module corresponding to the lens 210''' among other camera modules which are in the third set. In accordance with one feature of some embodiments the light emitting device 250 is positioned in close proximity to the reference camera module corresponding to the lens 210'''. Accordingly when the third set of camera modules is being used the light emitting device 250 is activated to indicate to the subject to look at the reference camera module during image capture operation.

Figure 11B:
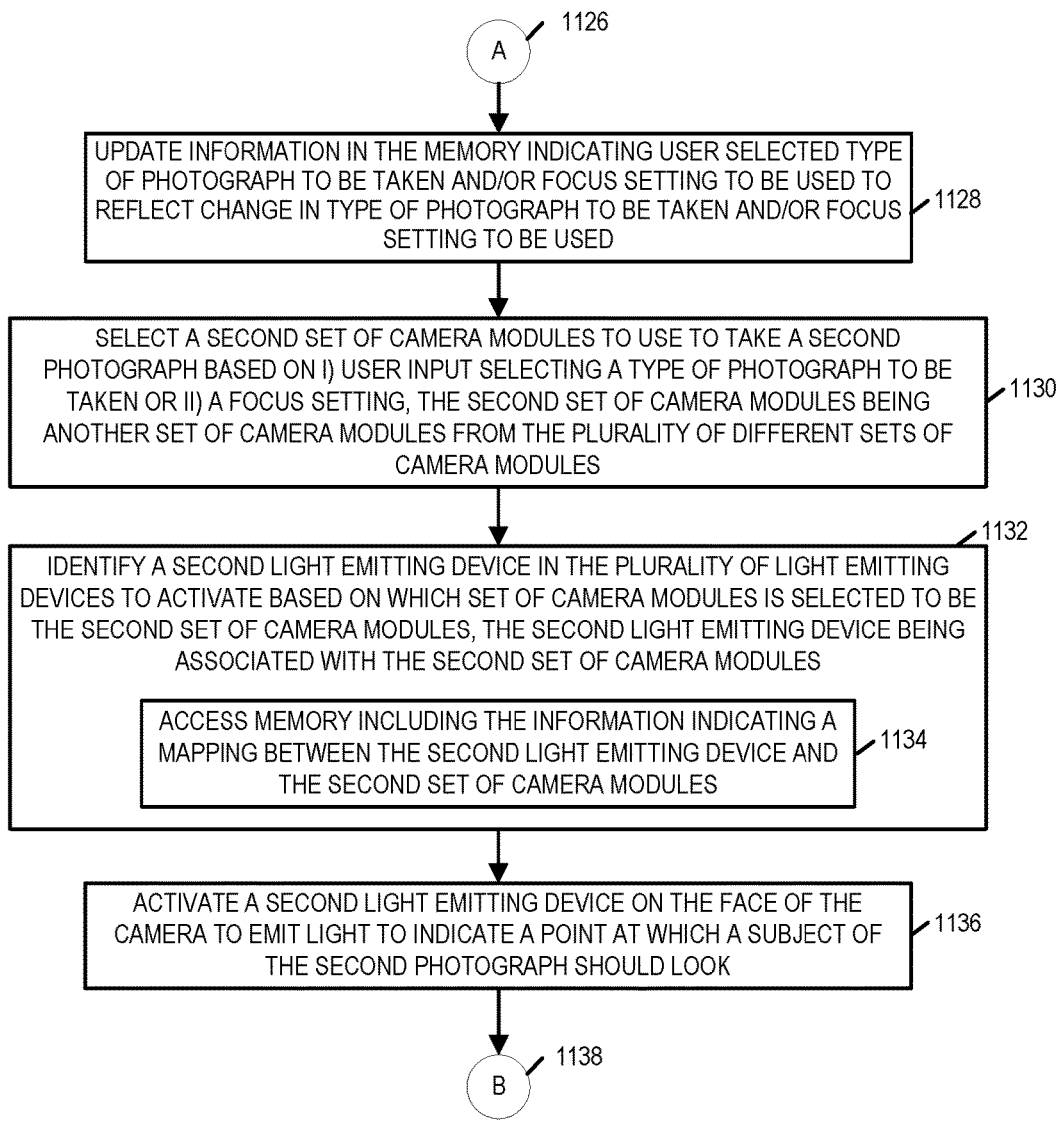
FIG. 11B is a second part of the flowchart illustrating the steps of an exemplary method of operating an exemplary camera device.

FIG. 11, which comprises the combination of FIGS. 11A and 11B, is a flowchart 1100 illustrating the steps of an exemplary method of operating a camera device and/or providing information about a condition of a camera including multiple lenses, in accordance with an exemplary embodiment. The exemplary method of flowchart 1100 can, and sometimes is, implemented by any of the camera devices of the present invention including the elements as the camera device 100 of FIG. 1. In various embodiments the camera device includes a plurality of optical chains, e.g., camera modules, arranged in an exemplary manner that may be appreciated from the front view of the camera such as that visible in FIGS. 2-10 and 13-14. The exemplary method starts in step 1102, e.g., when the camera device is powered on.

Figure 12:
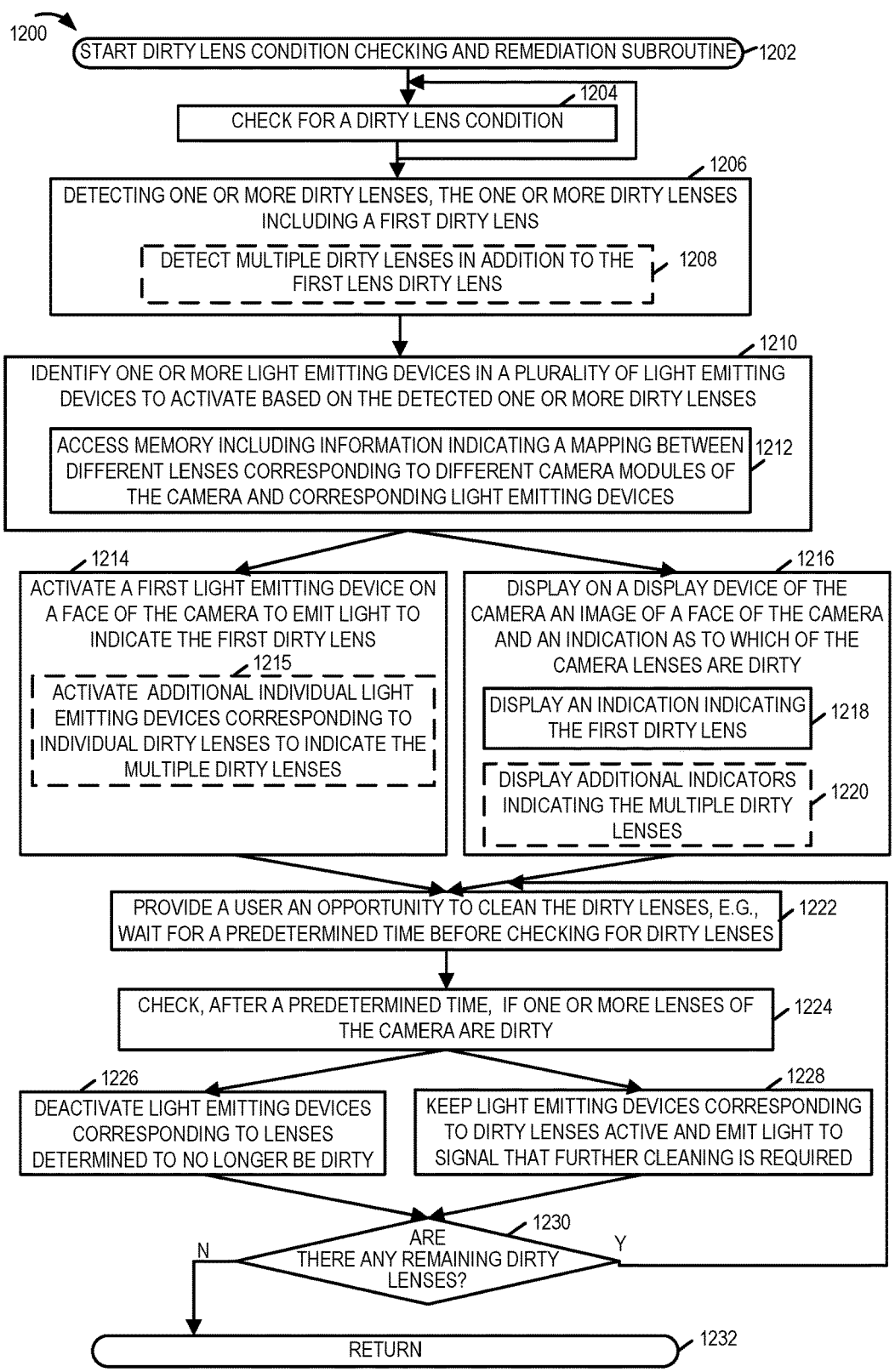
FIG. 12 is a flowchart illustrating the steps of a dirty lens condition check and remediation subroutine implemented in accordance with an exemplary embodiment.

Operation proceeds from start step 1102 to step 1104. In step 1104 the dirty lens condition checking and remediation subroutine is called. The exemplary flowchart illustrating the steps of the dirty lens condition checking and remediation subroutine 1200 is illustrated in FIG. 12. Referring now to FIG. 12 which illustrates the steps of the dirty lens condition checking and remediation subroutine 1200. The dirty lens condition checking and remediation subroutine 1200 execution starts in step 1202 and proceeds to step 1204. In step 1204 the camera device runs diagnostic testing to check for dirty lens condition to determine if one or more lenses corresponding to various different camera modules are dirty.

Operation proceeds from step 1204 to step 1206. In step 1206 the camera detects one or more lenses of the camera which are dirty. In some embodiments the step 1206 of detecting one or more dirty lenses includes detecting a first lens which is dirty. In some embodiments step 1206 further includes optional step 1208 of detecting multiple dirty lenses in the camera for which cleaning is required or recommended. Operation proceeds from step 1206 to step 1210. In step 1210 the camera device identifies one or more light emitting devices, e.g., LEDs, in a plurality of light emitting devices in the camera to activate based on which of the lenses are detected as being dirty. In some embodiments the identification step 1210 includes the step 1212 of accessing memory, e.g., camera device memory, including information indicating a mapping between different lenses corresponding to different camera modules in the camera and the light emitting devices corresponding to these lenses/camera modules. In some embodiments there is a one to one mapping between the lenses corresponding to different camera modules which may be inspected for dirty conditions and the light emitting devices. Thus by using the stored mapping information the light emitters, e.g., LEDs, corresponding to dirty lenses can be identified in accordance with the invention. In some embodiments as part of implementing step 1210 the camera identifies a first light emitting device corresponding to the first dirty lens. The first light emitting device being one of the plurality of light emitting devices on the face of the camera. In some embodiments the first light emitting device is a light emitter positioned at a first position on the face of the camera. In some embodiments the first position is at or near a center of a cluster of lenses of camera modules included in the first set of camera modules. In some embodiments the first position is adjacent a lens of a reference camera included in the first set of camera modules. In some embodiments the first light emitting device is arranged on the face of the camera adjacent the first lens. In some embodiments the first light emitting device is a light emitting ring surrounding said first lens. In some embodiments 1210 the camera further identifies multiple additional light emitting devices corresponding to multiple additional dirty lenses.

Operation proceeds from step 1210 to step 1214. In some embodiments the operation also simultaneously proceeds to step 1216 which may be performed in parallel with step 1214 or as an alternative to step 1214. In step 1214 the camera activates a first light emitting device on the face of the camera (e.g., such as face 201 of camera 200) to emit light to indicate the first dirty lens, e.g., indicating that the first lenses is dirty and need cleaning. In some embodiments where multiple additional dirty lenses are detected, step 1215 is performed as part of step 1214 where additional individual light emitting devices corresponding to the individual additional dirty lenses are activated to indicate the detected multiple dirty lenses. As can be appreciated step 1214 and 1215 show one way of indicating the dirty lenses to the user by activating light emitters corresponding to the detected one or more dirty lenses on the face of the camera. Operation proceeds from step 1214 to step 1222. Step 1216 (including steps 1218, 1220) illustrates another way of indicating the dirty lenses to the user of the camera in accordance with the invention. In step 1216 the camera device displays on a camera display device, e.g., display screen on the back of the camera, an image of the face of the camera and an indication as to which lens or lenses are dirty. For example an actual, simulated and/or camera generated image of the face of the camera (e.g., such as shown in FIG. 5) with multiple lenses corresponding to different camera modules may be displayed to the user on the camera display along with an indicator indicating the lens or lenses which are dirty. In some embodiments as part of step 1216 step 1218 is performed where the image of the face of the camera is displayed along with an indication indicating the first dirty lens to the user on the camera display. In some embodiments as part of step 1216 step 1220 is performed where the image of the face of the camera is displayed along with additional indicators indicating multiple dirty lens to the user on the camera display. Operation proceeds from step 1216 to step 1222.

In step 1222 a user of the camera is provided an opportunity to clean the lenses which have been indicated as being dirty in the above discussed manner. In some embodiments providing an opportunity to the user includes waiting for a predetermined time period (after an indication has been shown to the user in any manner as discussed in steps 1214 and 1216) before checking for the dirty lens condition of the lenses indicated as being dirty.

Operation proceeds from step 1222 to step 1224. In step 1224 after the predetermined time the lens condition of one or more camera lenses is checked to determine if the lenses are clean or still dirty. Operation proceeds from step 1224 to step 1226 and/or 1228, e.g., based on the checking performed in step 1224 one or both of the steps 1226 and 1228 are performed. In step 1226 the light emitting devices corresponding to the lenses which are determined to be no longer dirty are deactivated, e.g., to indicate that dirty lens(es) have been cleaned and are in good condition. In step 1228 the light emitting devices corresponding to the lenses which are determined to be still unclean/dirty are controlled to continue to emit light to signal to the user that further cleaning is required.

Operation proceeds from steps 1226 and 1228 to step 1230. In step 1230 it is determined if there are any remaining dirty lenses. In some embodiments step 1230 may be performed after waiting for a predetermined time in order to provide the user an opportunity to clean the still dirty lenses indicated in step 1228. If in step 1230 it is determined that there are more dirty lenses that require cleaning, the operation proceeds from step 1230 back to step 1222 to provide the user an opportunity to clean the still dirty lenses and the relevant steps are repeated until the dirty lenses are cleaned or the user manually overrides to ignore the indication regarding the dirty lenses. If in step 1230 it is determined that there are no more dirty lenses, the operation proceeds from step 1230 to the return step 1232 via which the process returns back to the method of flowchart 1100 (e.g., step 1104).

Referring back to flowchart 1100 of FIG. 11. After the execution and completion of subroutine 1200 the operation returns to step 1104. Upon return the operation proceeds to step 1106. In step 1106 the camera device monitors for user input, e.g., input selecting type of picture to be taken, mode of operation, zoom level, focus setting and/or other types of input. Operation proceeds from step 1106 to step 1108. In step 1108 the camera receives a user input selecting a type of photograph to be taken, e.g., normal picture, panoramic, high dynamic range, color, black and white etc. In some embodiments a focus setting value 1107 to be used for capturing the photograph is also selected. The selected focus setting value 1107 may be user selected, e.g., received as a user input, or camera selected. Operation proceeds from step 1108 to step 1110. In step 1110 the camera stores, in memory, information indicating user selected type of photograph to be taken and/or the focus setting to be used.

Operation proceeds from step 1110 to step 1112. In step 1112 the camera device selects a first set of camera modules to use to take a first photograph based on i) the user input selecting a type of picture to be taken and/or ii) focus setting to be used. In various embodiments the camera includes a plurality of camera modules. In various embodiments the first set of camera modules is from a plurality of different sets of camera modules included in the camera device. In accordance with one aspect the exemplary camera devices of the present invention include a plurality of camera modules. Various different camera modules among the plurality of camera modules can be grouped into various different sets. For example three different sets of camera modules are shown in FIGS. 7-10. A given set of camera modules which is most suitable for taking a photograph is selected by the camera in some embodiments based on the criteria discussed in step 1112. In some embodiments the first set of camera modules does not include at least some camera modules in the camera, camera modules not included in the first set of camera modules being left unused during the taking of the first photograph.

Operation proceeds from step 1112 to step 1114. In step 1114 the camera device identifies a first light emitting device in a plurality of light emitting devices to activate based on the selected first set of camera modules. In some embodiments the identification step 1114 includes the step 1116 of accessing memory, e.g., camera device memory, including information indicating a mapping between sets of camera modules (corresponding to different lenses) in the camera and corresponding light emitting devices, the information indicating the first light emitting device being associated with the first set of camera modules. Thus in various embodiments the mapping information indicates which light emitting device are associated with which set of camera modules. A set may include one or a plurality of camera modules. In some embodiments there is a one to one mapping between the sets of camera modules and the light emitting devices. In some embodiments there is a one to one mapping between the lenses corresponding to the camera modules in the camera and the light emitting devices. Thus in some embodiments depending on which of the plurality of different sets of camera modules is selected for use in image picture at the given time, one or more corresponding light emitting devices are identified, e.g., using stored mapping information.

Operation proceeds from step 1114 to step 1118. In step 1118 the camera device activates the first light emitting device on the face of the camera to emit light to indicate a point at which a subject of the first photograph should look. In some embodiments step 1118 includes optional step 1120 in which additional light emitting devices corresponding to additional lenses corresponding to the camera modules in the first set of camera modules are activated at the same time the first light emitting device is activated. For example in some embodiments all light emitters corresponding to the first set of camera modules may be activated to indicate to the user all camera modules which are being used to take the photograph.

Operation proceeds from step 1118 to step 1122. In step 1122 the camera receives additional user input selecting a type of photograph to be taken and/or a focus setting to be used. Operation proceeds from step 1122 to step 1124. In step 1124 it is determined if the user selected type of photograph and/or focus setting is different from the last selected type of photograph and/or focus setting. If in step 1124 it is determined that the user selected type of photograph and/or focus setting is same as the last selected type of photograph and/or focus setting, the operation proceeds from step 1124 to step 1118 and one or more of the relevant steps are repeated to indicate to a subject of the photograph where to look. If however it is determined that the user selected type of photograph and/or focus setting is different from the last selected type of photograph and/or focus setting the operation proceeds from step 1124 to step 1128 via connecting node A 1126. In step 1128 the information indicating user selected type of photograph to be taken and/or focus setting to be used is updated.

Operation proceeds from step 1128 to step 1130. In step 1130 a second set of camera modules to be used to take a second photograph is selected based on i) the additional user input selecting a type of picture to be taken and/or ii) focus setting to be used. In various embodiments the second set of camera modules is another set of camera modules from the plurality of different sets of camera modules in the camera.

Operation proceeds from step 1130 to step 1132. In step 1132 the camera device identifies a second light emitting device in the plurality of light emitting devices to activate based on the selected second set of camera modules. In some embodiments the identification step 1132 includes the step 1132 of accessing stored information indicating a mapping between sets of camera modules/lenses in the camera and corresponding light emitting devices, the information indicating the second light emitting device being associated with the second set of camera modules. Following identification of the second light emitting device associated with the second set of camera modules the operation proceeds from step 1132 to step 1136. In step 1136 the camera device activates the second light emitting device on the face of the camera to emit light to indicate a point at which a subject of the second photograph should look. In some embodiments additional light emitting devices corresponding to additional lenses corresponding to the camera modules in the second set of camera modules are activated at the same time the second light emitting device is activated. Operation proceeds from step 1136 back to step 1122 via connecting node B 1138 and the operation may continue in this manner for additional received inputs.

Figure 13:
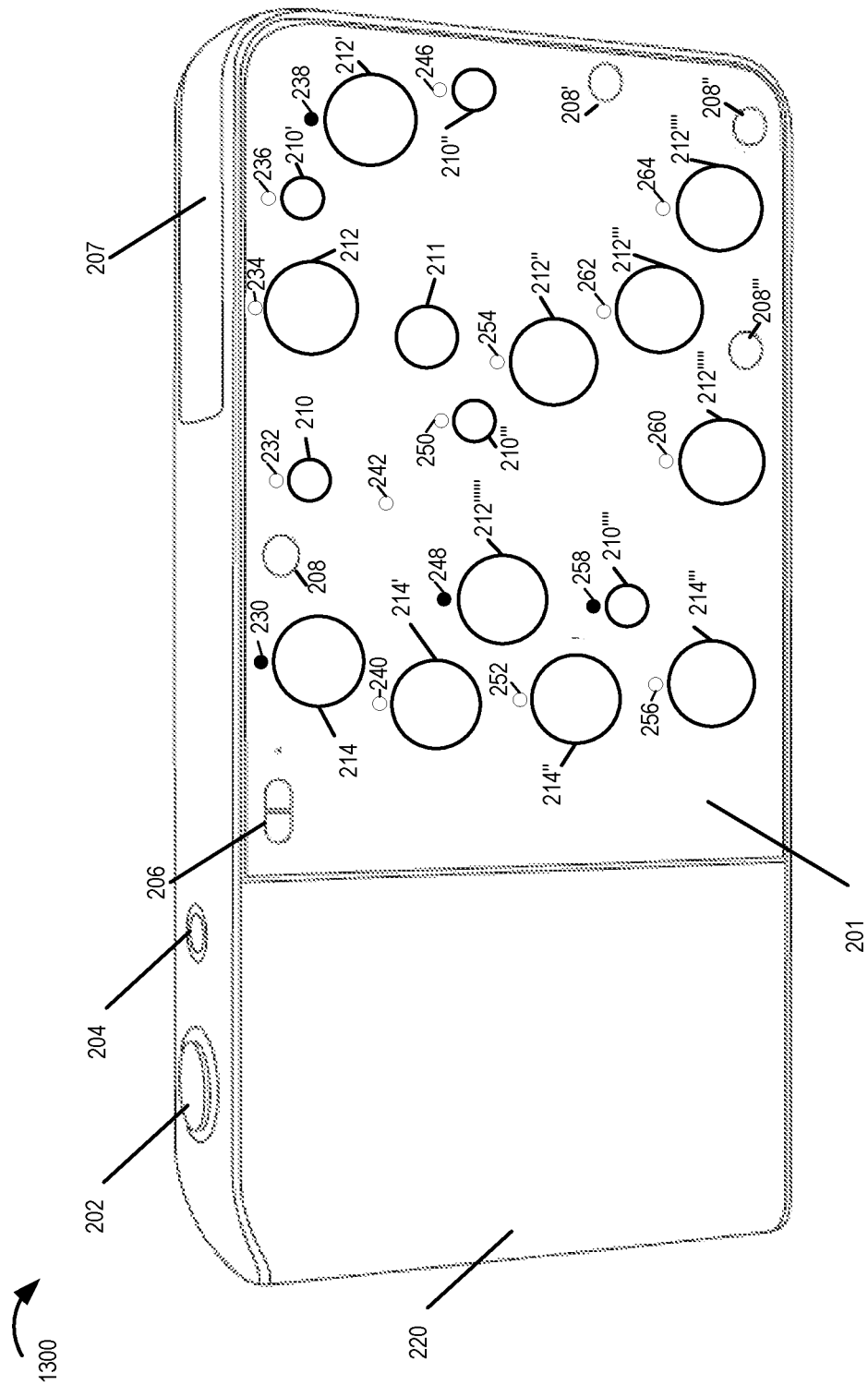
FIG. 13 illustrates an example scenario where multiple different light emitting devices corresponding to multiple different camera modules/lenses of a camera are activated, e.g., powered to emit light, to indicate the lenses which are determined to be dirty.

FIG. 13 is a drawing 1300 illustrating a scenario where multiple different light emitting devices corresponding to multiple different camera modules/lenses of camera 200 are activated, e.g., powered to emit light (indicated by solid black fill), to indicate the lenses which are determined to be dirty. FIG. 13 example is similar to what was depicted in FIG. 3 example but with multiple light emitting devices being lit up indicate multiple dirty lenses. As discussed with regard to the embodiment of FIGS. 2-3 the light emitting devices are positioned, e.g., on the camera face, adjacent the camera module outer lenses to which the light emitting devices correspond. In the illustrated example of FIG. 13 it is considered that multiple camera module lenses 214, 212', 212'''' and 210'''' are determined to be dirty. Thus in accordance with one aspect of the invention the light emitting devices 230, 238, 248 and 258 associated with and/or corresponding to the camera modules corresponding to the dirty lenses are activated to indicate to the user that these lenses are dirty and needs cleaning while light emitting devices corresponding to lenses which were not detected to be dirty are left unlit. In various embodiments the user is provided an opportunity to clean the dirty lenses and after a period of time a check is made to determine if the camera lenses which were indicated to be dirty are still dirty. In some embodiments upon determining that the lenses 214, 212', 212'''' and 210'''' which were previously determined to be dirty but are no longer to be dirty the associated light emitting devices 230, 238, 248 and 258 are deactivated.

Figure 14:
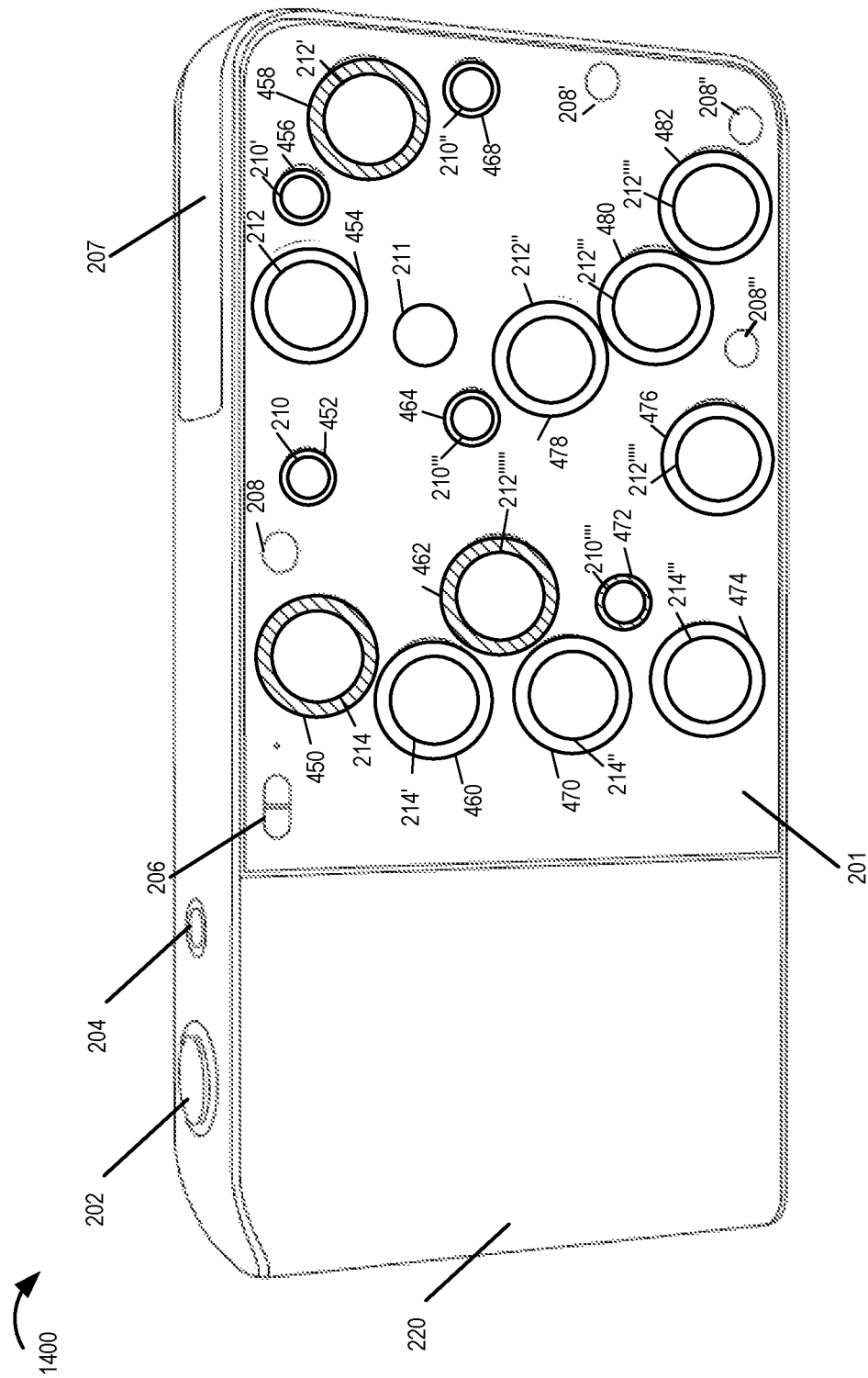
FIG. 14 illustrates a scenario where multiple different light emitting device rings around corresponding multiple different lenses of a camera are activated to indicate the dirty lenses.

FIG. 14 is a drawing 1400 illustrating a scenario where multiple different light emitting device rings around corresponding multiple different camera modules/lenses of camera 400 are activated, e.g., powered to emit light (diagonal line pattern fill indicating lit up LEDs), to indicate the dirty lenses. FIG. 14 example is similar to what was depicted in FIG. 5 example but with multiple light emitting devices being lit up indicate multiple dirty lenses. As discussed with regard to the embodiment of FIGS. 4-5 the light emitting devices in such embodiments are arranged to form a ring surrounding the camera module lens to which a given light emitting device corresponds. When activated, the light emitting device ring illuminates forming a light ring around the lens. In the illustrated example of FIG. 14 the camera module lenses 214, 212', 212'''' and 210'''' are determined to be dirty. Thus in accordance with one aspect of the invention the light emitting device rings 450, 458, 462 and 472 associated with and/or corresponding to the camera modules corresponding to the dirty lenses are activated to indicate to the user that these lenses are dirty and needs cleaning while light emitting devices corresponding to lenses which were not detected to be dirty are left unlit.

Figure 15:
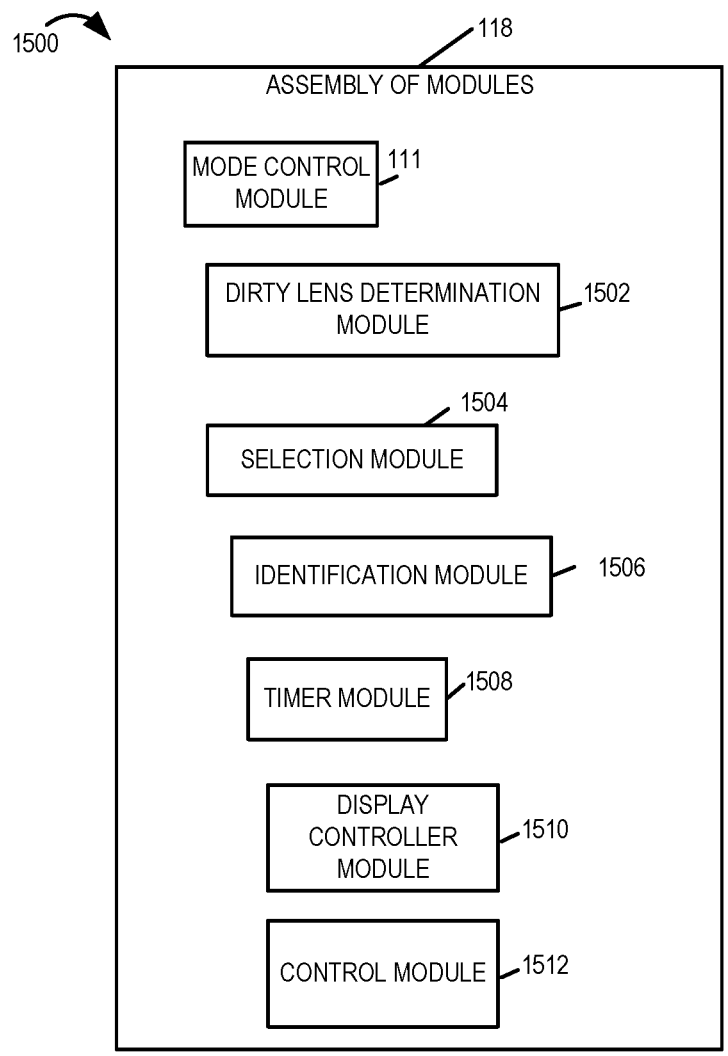
FIG. 15 illustrates an assembly of modules which is used in the camera devices of the present invention shown in various figures.

FIG. 15 is a drawing 1500 illustrating the assembly of modules 118 which is used in the camera device 100 and various other camera devices of the present invention shown in other figures. The assembly of modules 118 includes modules including one or more software routines, e.g., machine executable instructions, for implementing the methods of the present invention including image capture, dirty lens condition determination, light emitting device activation and/or deactivation methods of the present invention. Individual steps and/or lines of code in the modules of assembly 118 when executed by the processor 110 control the processor 110 to perform steps of the method of the invention, e.g., activating light emitting device(s) to indicate a dirty lens or a point at which a subject of a photograph should look, determining one or more dirty lenses and/or displaying an image of a face of the camera with an indication of dirty lenses etc., in accordance with the invention. While the assembly of modules 118 illustrated in FIG. 15 is used in the camera device 100 in some embodiments, the assembly of modules 118 can be used in another processing device that includes a memory and processor, e.g., a computer, laptop, Smartphone, tablet device etc., to perform the functions corresponding to the steps of the methods of the invention.

In addition to the mode control module 111 already discussed above with regard to FIG. 1 the assembly of modules 118 further includes a dirty lens determination module 1502, a selection module 1504, an identification module 1506, a timer module 1508 and a display control module 1510.

The dirty lens determination module 1502 is configured to detect/determine one or more dirty lenses of the camera. In some embodiments one or more dirty lenses includes a first lens which is dirty. In some embodiments one or more dirty lenses includes multiple dirty lenses. Thus in some embodiments the dirty lens determination module 1502 detects multiple dirty lenses in addition to the first dirty lens. In some embodiments the dirty lens determination module 1502 is implemented in hardware as a dirty lens determinator 1502.

The selection module 1502 is configured to select a set of camera modules, from a plurality of different sets of camera modules in the camera, to use to take a photograph. In some embodiments the selection module 1502 is configured to select a first set of camera modules to use to take a first photograph, the first set of camera modules being from the plurality of different sets of camera modules in the camera. In some embodiments the selection module 1502 is further configured to select a second set of camera modules to use to take a second photograph, the second set of camera modules being another set of camera modules from the plurality of different sets of camera modules. In some embodiments the selection module 1502 is configured to select the set of camera modules, e.g., first and/or second set of camera modules, based on i) user input selecting a type of photograph to be taken (e.g., panoramic, normal, high dynamic range (in terms of light range), color, black and white) or ii) a focus setting to be used (near or far may use different sets of lenses). Thus in various embodiments the selection modules 1502 uses the current received user input 123 selecting a type of photograph to be taken and/or focus setting 125 stored in memory 108 to make the selection.

The identification module 1506 is configured to identify one or more light emitting devices in the camera to activate based on detected one or more dirty lenses. In some embodiments to identify one or more light emitting devices corresponding to the detected one or more dirty lenses the identification module 1506 accesses stored mapping information 121 in memory 108 indicating a mapping between camera modules and/or the lenses corresponding to the camera modules and light emitting devices. In some embodiments the identification module 1506 is configured to identify a first light emitting device corresponding to a first dirty lens. In some embodiments the identification module 1506 is further configured to identify additional light emitting devices corresponding to additional dirty lenses.

In some embodiments the identification module 1506 is configured to identify a first light emitting device in a plurality of light emitting devices to activate based on which of the plurality of different sets of camera modules is selected to be the first set of camera modules, e.g., to take a first photograph. In some embodiments the first light emitting device is associated with the first set of camera modules. In some embodiments the identification module 1506 is further configured to identify (e.g., by accessing memory indicating which light emitter corresponds to the second set of camera modules) a second light emitting device in the plurality of light emitting devices to activate based on which set of camera modules is selected to be the second set of camera modules, the light emitting device being associated with the second set of camera modules. In various embodiments when the first and/or second sets of camera modules are used to take a photograph at the given time the corresponding light emitting device (e.g., first or second) is identified by the identification module to activate, e.g., so a user can be indicated a point to look at during image capture.

In various embodiments the light control device 152 used in the camera of the present invention is configured to activate one or more light emitting devices on the face of the camera identified as corresponding to dirty lenses to emit light to indicate that the corresponding lenses are dirty. For example in some embodiments where the dirty lens determination module 1502 detects that the first lens is dirty, the identification module 1506 identifies the first light emitting device corresponding to the first lens and the light control device 152 is configured to activate the first light emitting device to emit light to indicate the first dirty lens and activate individual light emitting devices corresponding to individual dirty lenses to indicate the additional dirty lenses.

In various embodiments the light control device 152 is configured to activate one or more light emitting devices on a face of a camera to emit light to indicate a point at which a subject of a photograph should look. In some embodiments when the selection module 1504 selects the first set of camera modules to take a first photograph, the identification module 1506 identifies a light emitting device corresponding to the first set of camera modules and the light control device 152 is configured to activate the identified light emitting device to emit light to indicate a point at which a subject of a photograph should look, e.g., during image capture by the selected first set of camera modules. In some embodiments when the selection module 1504 selects the second set of camera modules to take a second photograph, the identification module 1506 identifies a second light emitting device corresponding to the second set of camera modules and the light control device 152 is configured to activate the second identified light emitting device to emit light to indicate a point at which a subject of the second photograph should look, e.g., during image capture by the selected second set of camera modules.

The timer module 1508 is configured to monitor time elapsed since the first light emitting device was activated to indicate the first dirty lens. In some embodiments the timer module 1508 is further configured to generate a recheck trigger signal when the time exceeds a predetermined time interval which has been set to provide a user an opportunity to clean the lenses which were indicated as being dirty. In some such embodiments the dirty lens determination module 1502 is further configured to recheck the lenses (e.g., lenses which were detected to be dirty and/or indicated as being dirty) for dirty condition, e.g., to determine if they are still dirty, in response to receiving the recheck trigger signal from the timer module 1508. In some such embodiments the light control device 152 is further configured to deactivate light emitting devices corresponding to lenses determined to no longer be dirty and keep light emitting devices corresponding to dirty lenses active and emitting light to signal that further cleaning is required.

The display controller 1510 is configured to control the camera to display, on a display device such as display 102, an image of a face of the camera and an indication as to which of the camera lenses are dirty.

The control module 1512 controls various modules of the assembly to perform their respective functions in accordance with the features of the present invention and manages input and output of the modules, e.g., providing input to a module in the assembly 118 from another module or element of the camera device 100 and/or providing the generated output from any of the modules in the assembly 118 to another module or element, e.g., for further processing, storage, display or transmission.

While FIG. 15 shows the assembly of modules 118 where at least some of the modules are implemented in software, e.g., machine executable instructions, it should be appreciated that such modules can, and in some embodiments are, implemented in hardware, e.g., as an ASIC, or a field-programmable gate array (FPGA) or other circuit, in the assembly of hardware modules 180. Thus the assembly of hardware modules 180 includes hardware modules, e.g., circuits, corresponding to each of the modules discussed above with regard to and shown in FIG. 15 including the mode control module 111, dirty lens determination module 1502, selection module 1504, identification module 1506, timer module 1508, display control module 1510 and the control module 1512. In still some embodiments the modules are implemented as a combination of software and hardware.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware. In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images maybe and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method of operating a camera, the method comprising:
    activating a first light emitting device, on a face of a camera including multiple camera modules, to emit light to indicate a point on the face of the camera at which a subject of a photograph should look, said first light emitting device being one of a plurality of light emitting devices positioned at different locations on the face of the camera.

2. The method of claim 1, wherein different ones of said light emitting devices are positioned between different clusters of camera modules.

3. The method of claim 1, further comprising, prior to activating the first light emitting device:
    operating the camera to select a first set of camera modules to use to take a first photograph, said first set of camera modules being from a plurality of different sets of camera modules in said camera; and
    identifying said first light emitting device in said plurality of light emitting devices to activate based on which of said plurality of different sets of camera modules is selected to be the first set of camera modules, said first light emitting device being associated with the first set of camera modules.

4. The method of claim 3, further comprising:
    operating the camera to select a second set of camera modules to use to take a second photograph, said second set of camera modules being another set of camera modules from the plurality of different sets of camera modules; and
    identifying a second light emitting device in said plurality of light emitting devices to activate based on which set of camera modules is selected to be the second set of camera modules, said second light emitting device being associated with the second set of camera modules.

5. The method of claim 3, wherein said first set of camera modules is selected based on i) user input selecting a type of photograph to be taken or ii) a focus setting to be used.

6. A method of providing information about a condition of a camera including multiple lenses, the method comprising:
    detecting one or more dirty lenses; and
    displaying on a display device on a back side of said camera an image of a face of the camera including multiple lenses and an indication as to which of the multiple lenses of the camera are dirty.

7. The method of claim 6, further comprising:
    activating at least one light emitting device on the face of the camera associated with a dirty lens to emit light to signal that the lens is dirty.

8. The method of claim 7, wherein activating at least one light emitting device on the face of the camera includes activating light emitting devices corresponding to multiple different dirty lenses to indicate which lenses are dirty while leaving light emitting devices corresponding to lenses which were not detected to be dirty unlit.

9. The method of claim 8, further comprising:
    after a period of time checking the camera lenses which were dirty to determine if they are still dirty; and
    deactivating the light emitting devices associated with lenses which were previously determined to be dirty but are no longer determined to be dirty.

10. The method of claim 6, wherein
    displaying on a display device on a back side of said camera an image of a face of the camera including multiple lenses and an indication as to which of the multiple lenses of the camera are dirty includes:
    displaying as part of said image at least three different lenses located at different distances from a bottom of said camera.

11. A camera device, comprising:
    a plurality of camera modules;

a plurality of light emitting devices on the face of said camera, said plurality of light emitting devices including a first light emitting device; and a light controller configured to activate said first light emitting device on a face of said camera to emit light to indicate a point on the face of the camera at which a subject of a photograph should look.

12. The camera device of claim 11, wherein different ones of said light emitting devices are positioned between different clusters of camera modules.

13. The camera device of claim 11, further comprising:
a selection module configured to select a first set of camera modules to use to take a first photograph, said first set of camera modules being from a plurality of different sets of camera modules in said camera; and
an identification module configured to identify said first light emitting device in said plurality of light emitting devices to activate based on which of said plurality of different sets of camera modules is selected to be the first set of camera modules, said first light emitting device being associated with the first set of camera modules.

14. The camera device of claim 13,
wherein said selection module is further configured to select a second set of camera modules to use to take a second photograph, said second set of camera modules being another set of camera modules from the plurality of different sets of camera modules; and
wherein said identification module is further configured to identify a second light emitting device in said plurality of light emitting devices to activate based on which set of camera modules is selected to be the second set of camera modules, said second light emitting device being associated with the second set of camera modules.

15. A camera including multiple lenses, comprising:
a dirty lens determinator configured to detect one or more dirty lenses; and
a display controller configured to control said camera to display, on a display device on a back side of said camera an image of a face of the camera including multiple lenses and an indication as to which of the multiple lenses of the camera are dirty.

16. The camera of claim 15, further comprising:
a plurality of light emitting devices on the face of said camera, said plurality of light emitting devices including: i) a first light emitting device corresponding to a first lens and being positioned at a location closer to said first lens than to a second lens of said camera; and ii) a second light emitting device on the face of said camera corresponding to the second lens and being positioned closer to the second lens than said first lens; and
a light controller configured to activate at least one light emitting device on the face of the camera associated with a dirty lens to emit light to signal that the lens is dirty.

17. The method of claim 1, wherein said point at which a subject of the photograph should look is one of a plurality of different points located between different camera modules.

* * * * *